(12) United States Patent
Akad

(10) Patent No.: US 7,261,345 B2
(45) Date of Patent: Aug. 28, 2007

(54) IMPACT ENERGY ABSORBING CRASH CUSHION

(76) Inventor: Osman E. Akad, Vasif Cinar Blvd., 5/11, 35220 Alsancak (TR)

(*) Notice: Subject to any disclaimer, the term of this patent is extended or adjusted under 35 U.S.C. 154(b) by 80 days.

(21) Appl. No.: 11/048,874

(22) Filed: Feb. 3, 2005

(65) Prior Publication Data

US 2006/0175848 A1   Aug. 10, 2006

(51) Int. Cl.
*B60R 19/22* (2006.01)
(52) U.S. Cl. .............. 293/109; 293/132; 293/133; 296/187.03; 296/187.09
(58) Field of Classification Search ........... 296/187.01, 296/187.02, 187.03, 187.04, 187.06, 187.09, 296/187.12, 187.13; 293/107, 109, 132, 293/133, 134
See application file for complete search history.

(56) References Cited

U.S. PATENT DOCUMENTS

| | | | | |
|---|---|---|---|---|
| 3,574,379 A | * | 4/1971 | Jordan | ............ 293/109 |
| 3,734,557 A | | 5/1973 | McKenzie | |
| 4,929,008 A | | 5/1990 | Esfandiary | |
| 4,971,376 A | | 11/1990 | Eipper et al. | |
| 5,042,859 A | * | 8/1991 | Zhang et al. | ............ 293/107 |
| 5,067,759 A | | 11/1991 | Fleming | |
| 5,090,755 A | | 2/1992 | Garnweidner | |
| 5,106,137 A | * | 4/1992 | Curtis | ............ 293/107 |
| 5,181,589 A | | 1/1993 | Siegner et al. | |
| 5,339,933 A | | 8/1994 | Bauer et al. | |
| 5,427,214 A | | 6/1995 | Prottengeier et al. | |
| 5,507,540 A | | 4/1996 | Pernot | |
| 5,810,427 A | * | 9/1998 | Hartmann et al. | ...... 296/187.03 |
| 6,065,786 A | * | 5/2000 | Wheatley | .............. 293/109 |
| 6,082,792 A | | 7/2000 | Evans et al. | |
| 6,148,970 A | | 11/2000 | Akad | |
| 6,302,472 B1 | * | 10/2001 | Rahmstorf et al. | ...... 296/146.5 |
| 6,341,813 B1 | * | 1/2002 | Taghaddos | ............ 296/187.06 |
| 6,387,200 B1 | | 5/2002 | Ashmead et al. | |
| 6,547,280 B1 | | 4/2003 | Ashmead | |
| 6,637,788 B1 | | 10/2003 | Zoellner et al. | |
| 6,644,701 B2 | | 11/2003 | Weissenborn et al. | |
| 6,695,104 B2 | | 2/2004 | Akad | |
| 2003/0020289 A1 | * | 1/2003 | Dohrmann et al. | ......... 293/107 |

* cited by examiner

*Primary Examiner*—Lori L. Lyjak
(74) *Attorney, Agent, or Firm*—Sughrue Mion, PLLC

(57) ABSTRACT

A crash cushion including a cushion filled with material; and a back plate including at least one recess communicating with a back of the cushion such that material from the cushion fills the recess; wherein the back plate is configured so that when a force is applied to said cushion, the material within the at least one recess breaks a portion of the bumper plate and exits the recess. A crash cushion including a cushion filled with material; a back plate, including at least one opening communicating with a back of the cushion such that the material from the cushion is capable of filling the recess; and at least one valve; wherein the at least one valve is configured so that when a force is applied to the cushion, a portion of the material within the cushion opens the valve and exits the cushion.

48 Claims, 21 Drawing Sheets

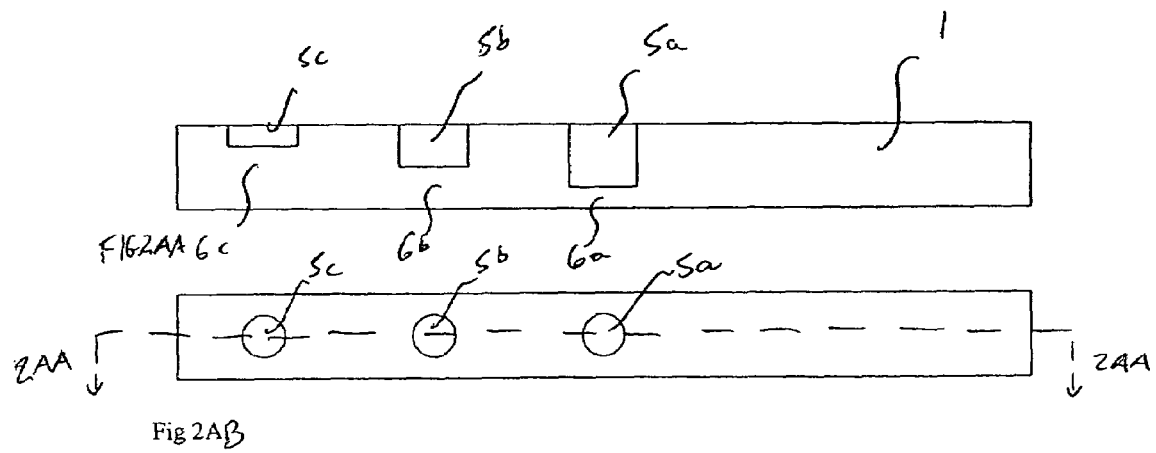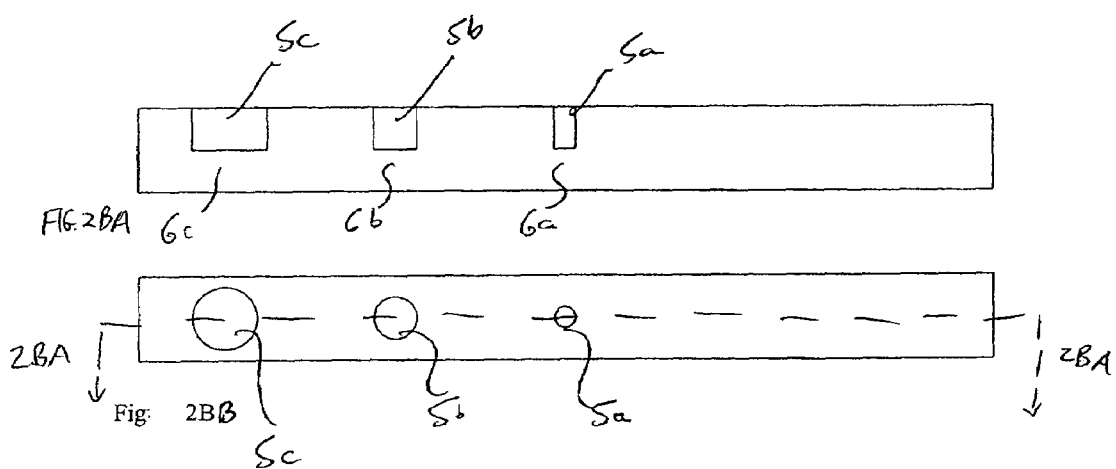

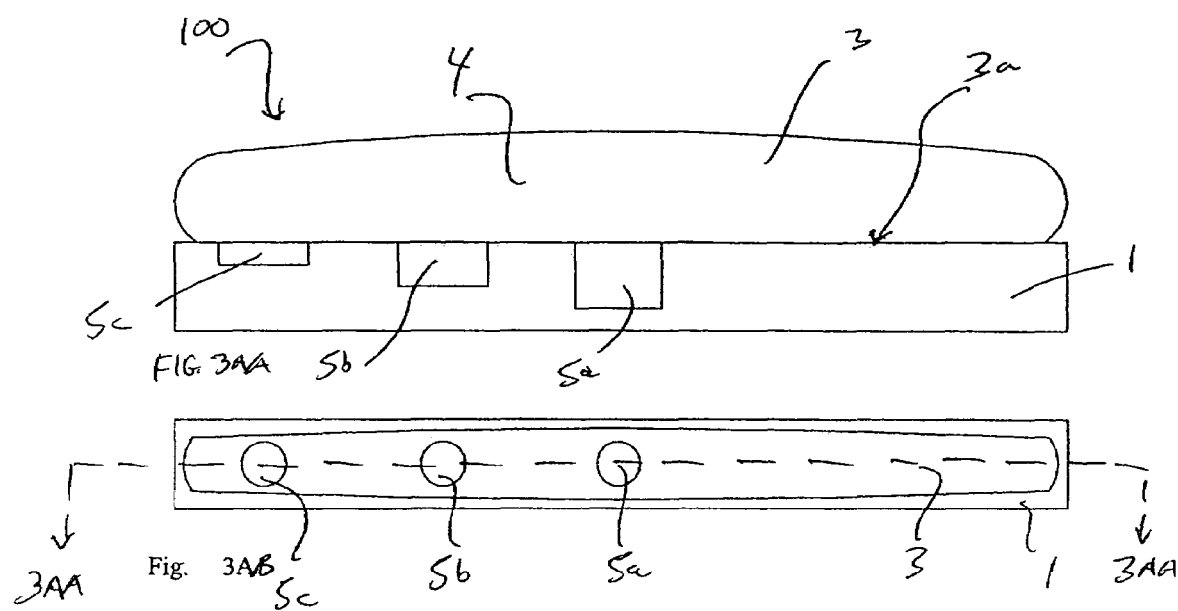
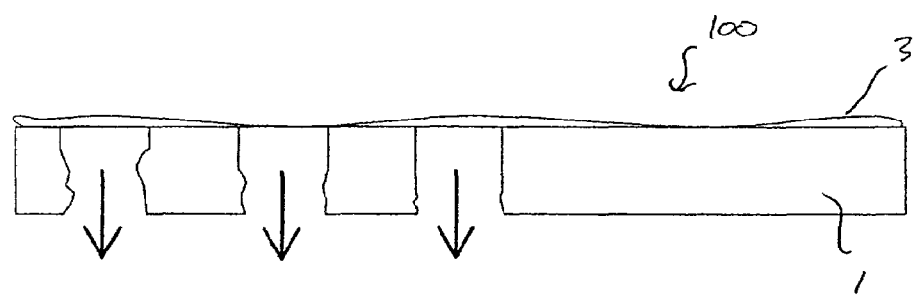
Fig 3B

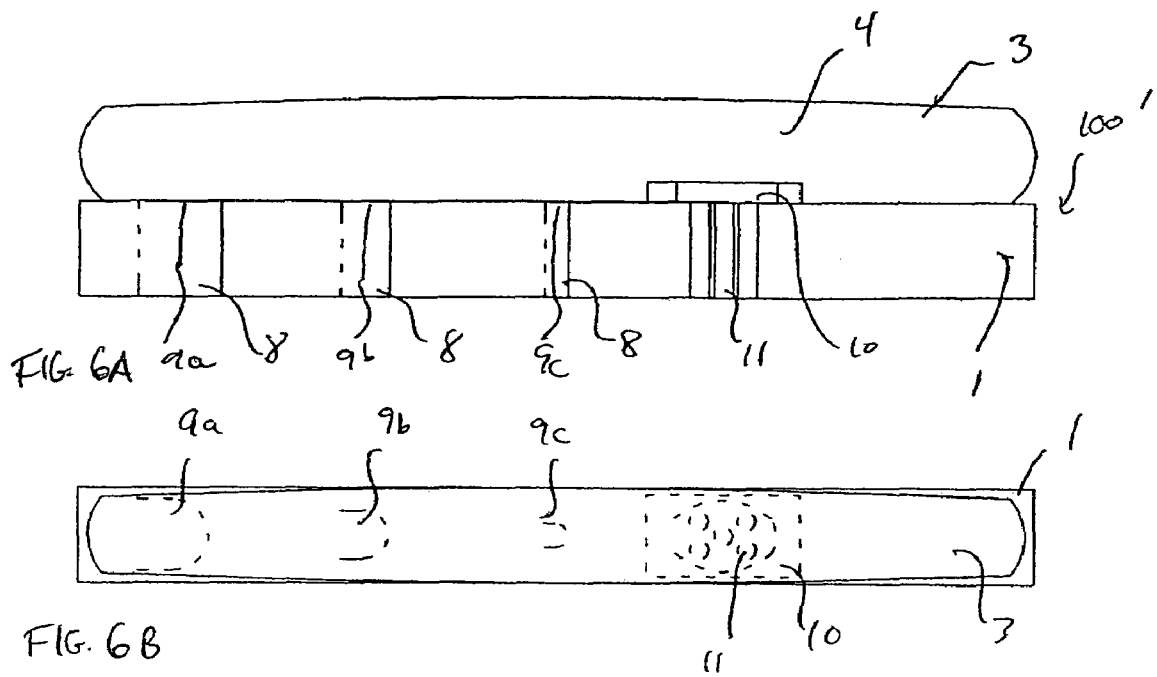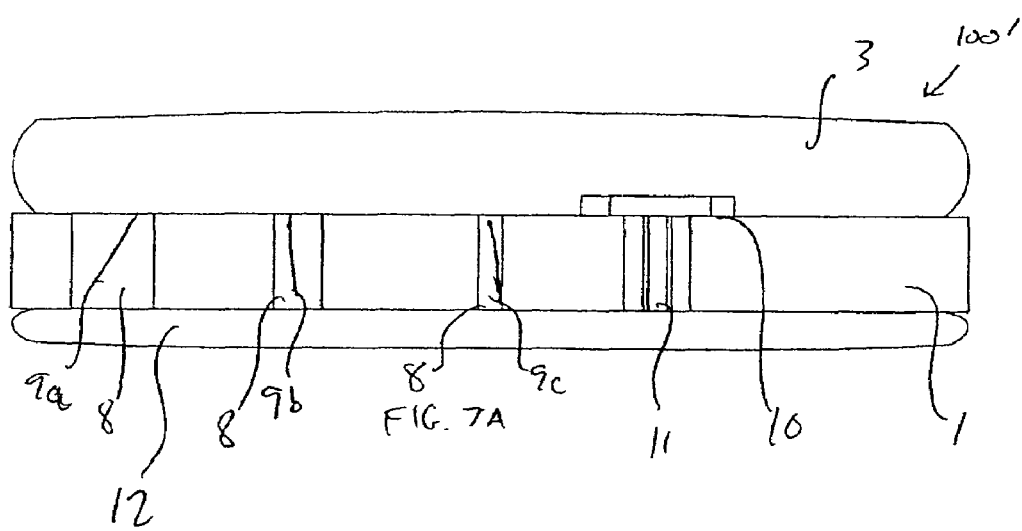

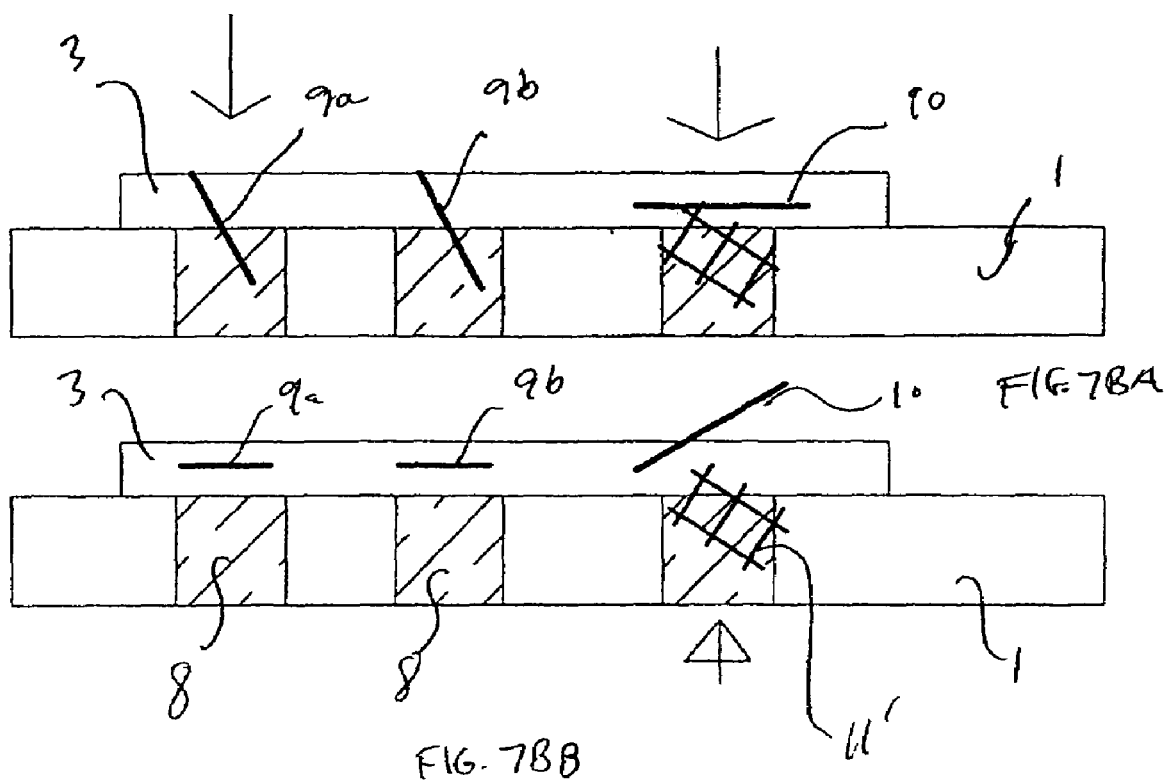

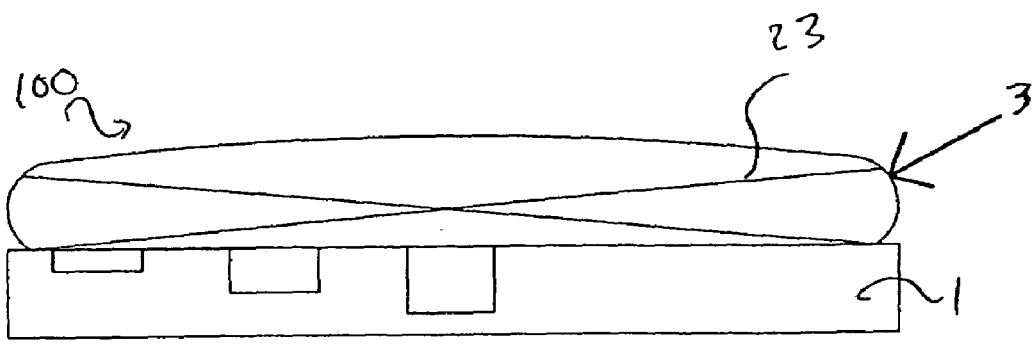
FIG. 12
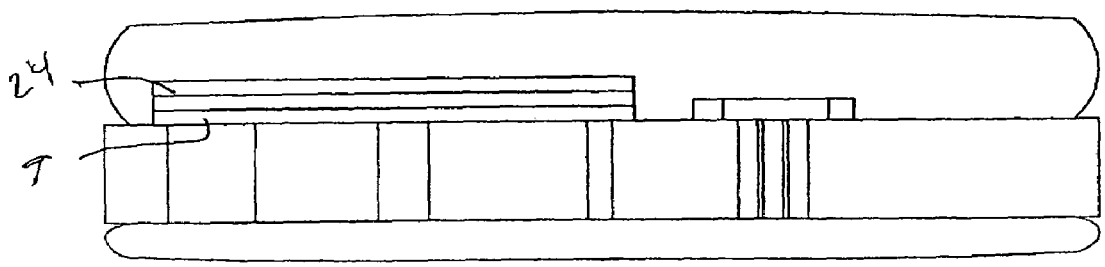
FIG. 13A
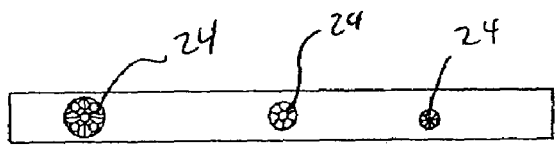
FIG. 13B
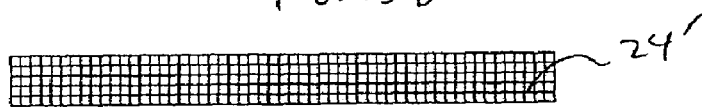
FIG. 13C
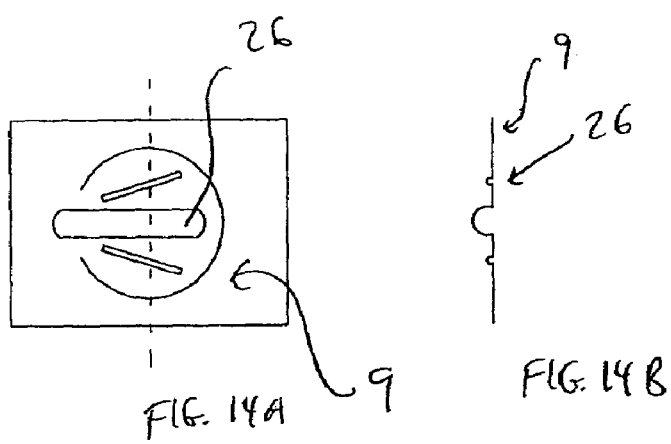
FIG. 14A
FIG. 14B

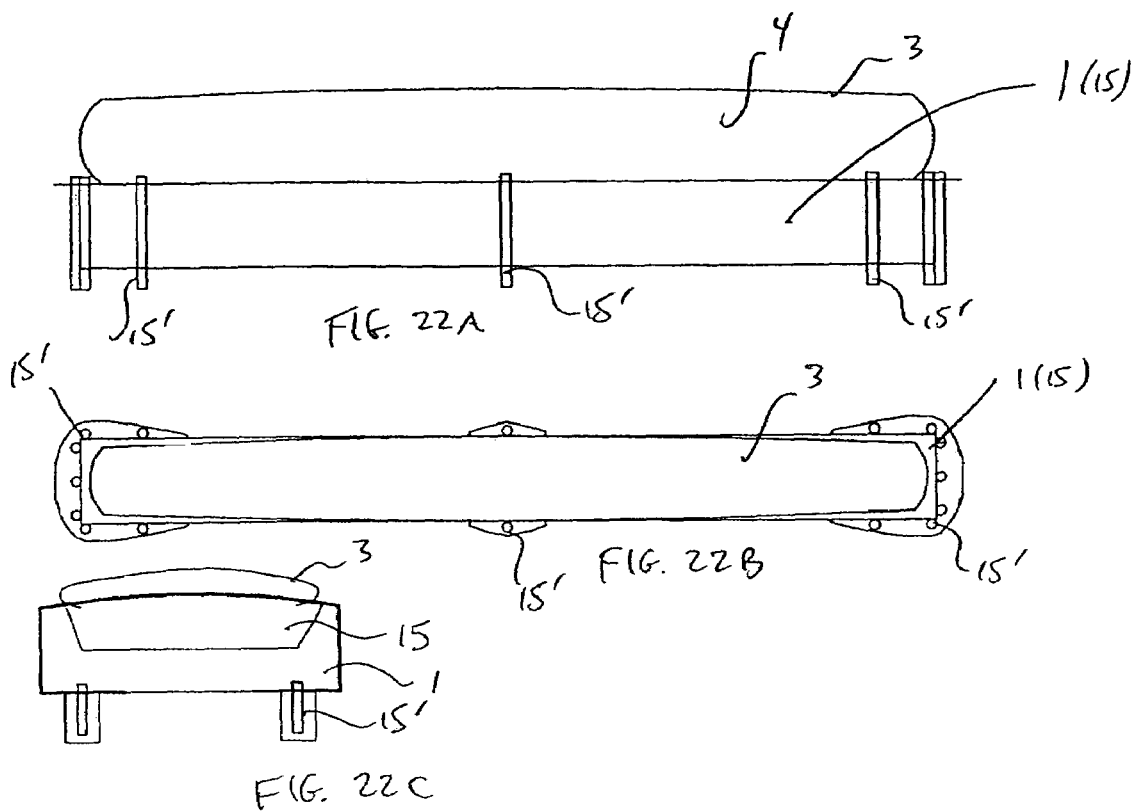
FIG. 22A
FIG. 22B
FIG. 22C
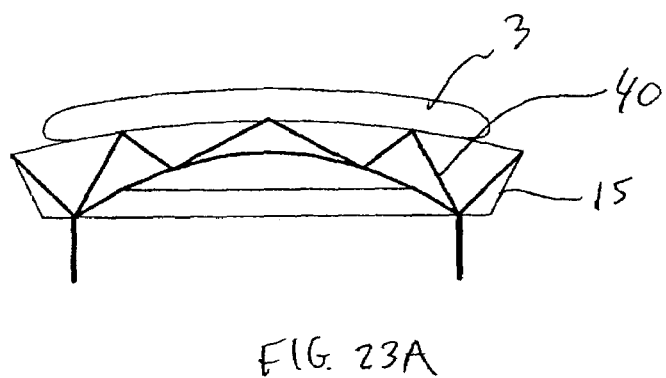
FIG. 23A

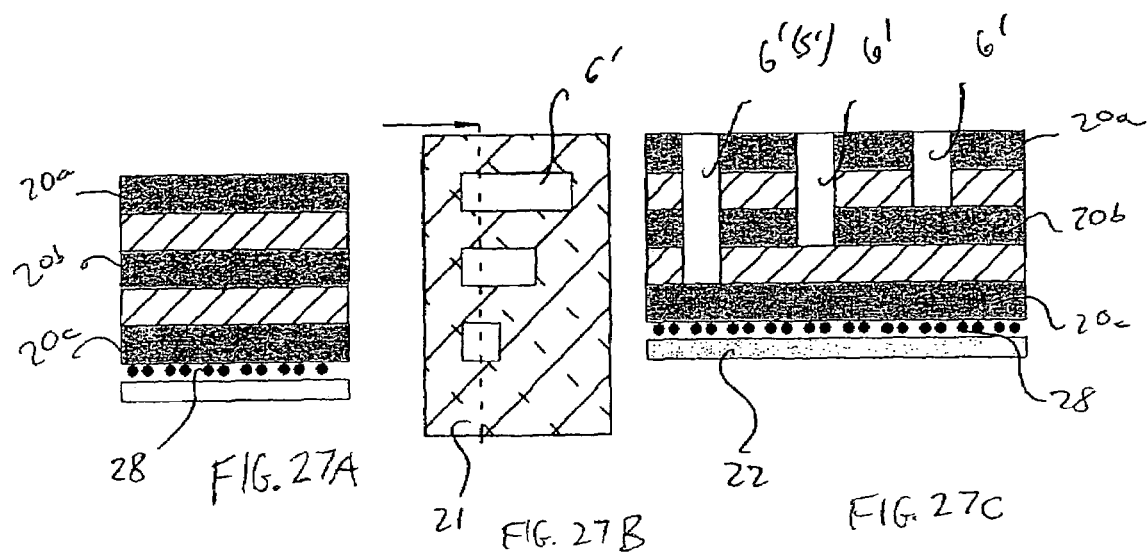
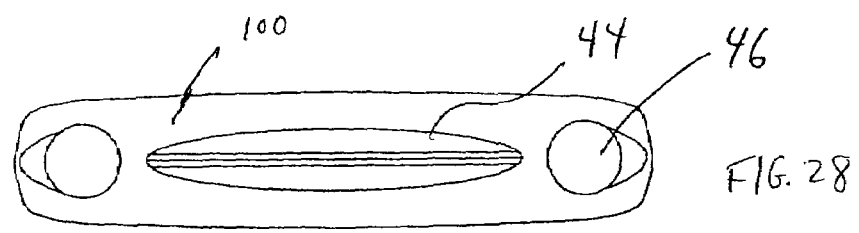
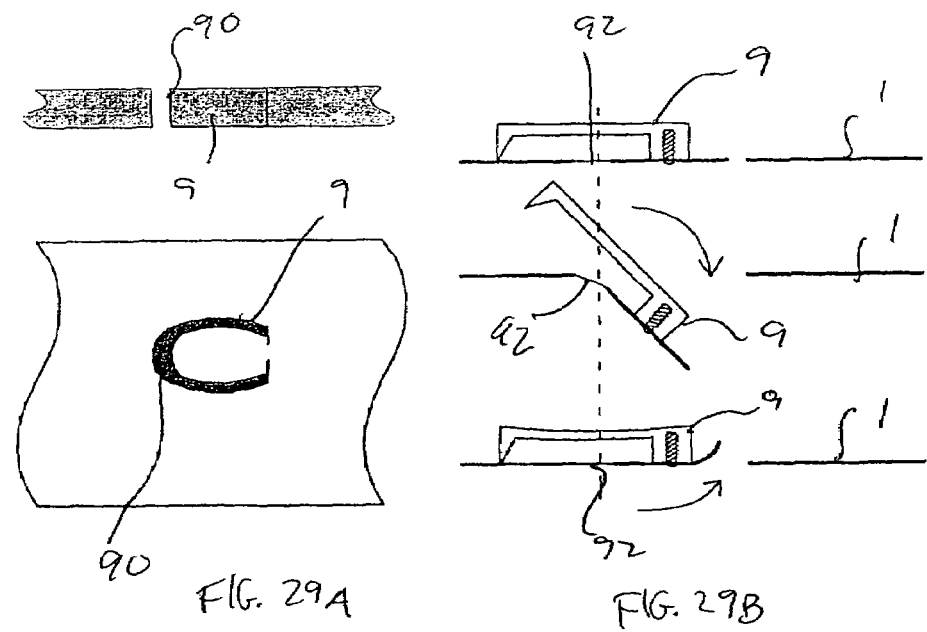

IMPACT ENERGY ABSORBING CRASH CUSHION

BACKGROUND

Existing vehicle bumpers can be filled with foam. The foam provides impact absorption when there is an impact between the vehicle and an object, such as another vehicle. However, the foam does sufficiently reduce the force of the impact.

U.S. Pat. No. 6,148,970 discloses an energy absorbing system in which a piston travels within a fluid filled chamber, which has weak spots formed in a sequence along a length of the side wall of the chamber. When an impact force is applied to the piston, the movement of the piston increases the pressure of the fluid within the chamber, which causes the weakest of the weak spots to rupture. As the force is increased, the weak spots will rupture in sequence, providing a superior shock absorbing system.

In addition, U.S. Pat. No. 6,695,104 discloses a reusable energy absorbing system similar to that in U.S. Pat. No. 6,148,970. In this system, the impact force on the piston causes a discharge of fluid through two-way valves from the chamber into an elastic balloon structure. Then, when the impact force is removed from the piston, the fluid returns into the chamber from the two-way valve.

The present invention relies on principles similar to those in U.S. Pat. No. 6,148,970 and U.S. Pat. No. 6,695,104 in order to provide an improved impact energy absorbing crash cushion that is suitable for use as, for example, a vehicle bumper.

SUMMARY OF THE INVENTION

According to a first aspect of the invention, a crash cushion includes a cushion filled with material; and a back plate including at least one recess communicating with a back of said cushion such that said material from said cushion fills said recess; wherein said back plate is configured so that when a force is applied to said cushion, the material within said at least one recess breaks a portion of said back plate and exits said at least one recess.

According to a second aspect of the invention, a crash cushion includes a cushion filled with material; a back plate; including at least one opening communicating with a back of said cushion; and at least one valve; wherein said at least one valve is configured so that when a force is applied to said cushion, a portion of the material within the cushion opens the at least one valve and exits said cushion.

BRIEF DESCRIPTION OF THE DRAWINGS

The advantages, nature and various additional features of the invention will appear more fully upon consideration of the illustrative embodiment of the invention which is schematically set forth in the accompanying drawings.

FIGS. 2AA-2BB are schematic views of crash cushions of a first exemplary embodiment showing variable depth and variable area recesses, respectively.

FIG. 3AA and 3AB show a crash cushion of the first exemplary embodiment with a back plate, weakened areas, and cushion.

FIG. 3B shows the crash cushion of FIG. 3AA with the weakened areas at an end of the recesses broken after an impact.

FIGS. 6A and 6B show the back plate and a cushion filled with a material of the second exemplary embodiment.

FIG. 12 shows a crash cushion with criss-crossed cables to provide added structural integrity for side impacts on the cushion.

FIG. 13A shows additional orifices provided before or after the exhaust reed valves.

FIG. 13B shows shapes with holes within the additional orifices.

FIG. 13C shows a screen used within the additional orifices.

FIGS. 14A and 14B show indentations engineered on the reed valve in order to strengthen the bending of reed valve without increasing the thickness of metal reed valve.

FIGS. 18DA-18E show how structural integrity can be added to the crash cushion by utilizing securing pins that limit the bending of the reinforcing piece.

FIGS. 22A-22C show an embodiment of the crash cushion that is designed to add structural strength to a bumper, or bumper back plate, for connecting it to car chassis.

FIGS. 23A and 23B show a back plate supported by a string as a beam, which uses plate curvature to increase the amount of bending and crumbling of back plate under an impact force.

FIGS. 27A-27C show details of the multiple layers and weakened areas provided in the multiple layers.

FIG. 28 shows a crash cushion that is molded as the front fascia of a car.

FIGS. 29A and 29B schematically show the operation of reed valves.

DETAILED DESCRIPTION OF EXEMPLARY EMBODIMENTS

Figure 1A:
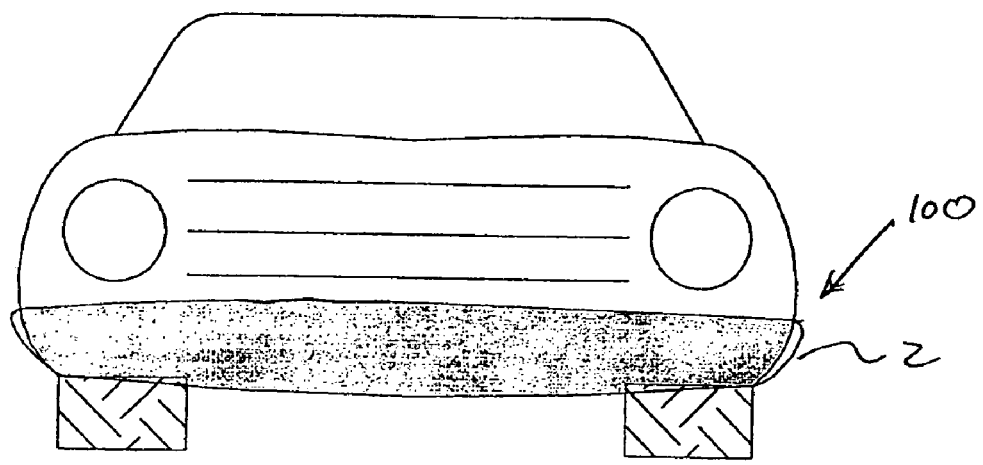
FIGS. 1A and 1B are schematic views of a crash cushion used as the bumper back plate behind the front bumper cover of a vehicle.

While the invention is open to various modifications and alternative forms, specific embodiments thereof are shown by way of examples in the drawings and are described herein in detail. There is no intent to limit the invention to the particular forms disclosed.

An impact energy absorbing crash cushion that can be mounted in front of a vehicle bumper. Alternatively, the crash cushion can be used on a barrier provided at the side of a highway, or placed inside a vehicle side door panel. The crash cushion is designed to decelerate a vehicle in such a way that it may prevent severe bodily injury to vehicle passengers.

Figure 1B:
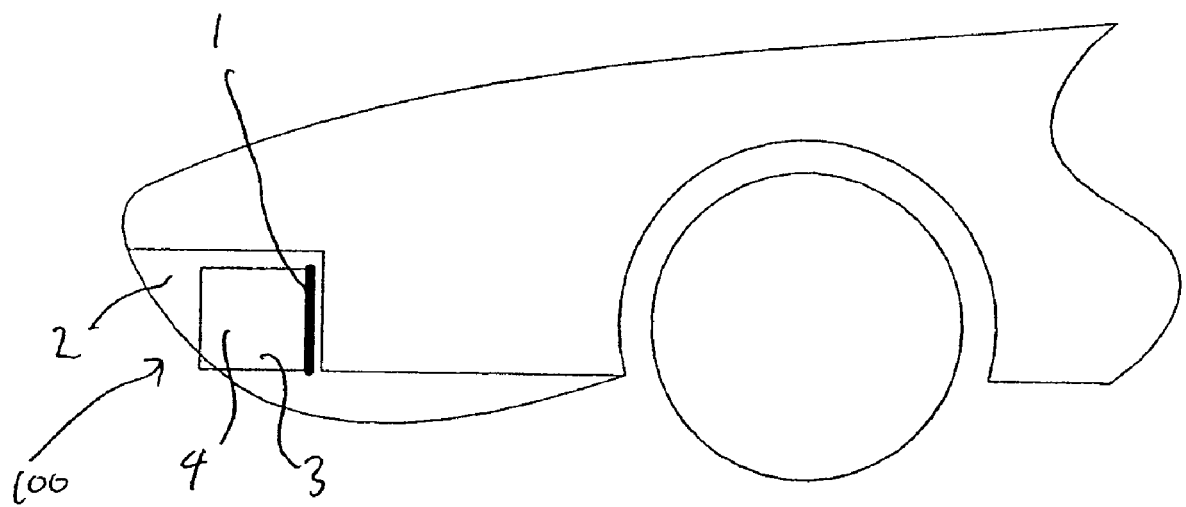

FIGS. 1A and 1B show front and side views, respectively of a crash cushion 100 used as a vehicle bumper. As shown in FIGS. 1A and 1B, the crash cushion 100 can be provided behind a vehicle bumper cover 2. The crash cushion 100 includes a back plate 1 and a cushion 3 filled with a material 4. The cushion 3 can be, for example, a flexible, but non-enlarging, cushion. The material 4 can be, for example, a gel, a fluid, or a solid material that becomes a liquid when under pressure (such as silicone).

According to a first exemplary embodiment of the invention shown in FIGS. 2AA-2BB, the crash cushion 100 is a single-use crash cushion with variable depth or variable area recesses 5a, 5b, 5c. Weakened areas 6a, 6b, 6c, which are provided at ends of the recesses 5a, 5b, 5c, are designed to break sequentially when the pressure of the material within cushion increases due to an impact force.

As shown in FIG. 3AA and 3AB, the back plate 1 communicates with a back side 3a of the cushion 3 so that the material from the cushion fills the recesses 5a, 5b, 5c. The back side 3a of the cushion refers to the side that would be closer to a vehicle engine if the crash cushion 100 is used as a vehicle bumper. The recesses 5a, 5b, 5c can have variable depths as shown in FIG. 2AA and 2AB, or variable areas, as shown in 2BA and 2BB, respectively.

FIG. 3B shows the breaking of the weakened portions 6a, 6b, 6c. The back plate 1 is configured so that when a force greater than a first predetermined value is applied to the cushion 3, the material 4 within a first recess 5a breaks a first, weakened portion 6a of the back plate 1 and exits the first recess 5a. Then, when a force greater than a second predetermined value is applied to the cushion 3, the material 4 within a second recess 5b breaks a second, weakened portion 6b of the back plate and exits the second recess 5b.

Because the second predetermined value is greater than the first predetermined value, the first, weakened portion 6a breaks before the second weakened portion 6b. Impact energy is dissipated by breaking weakened areas 6a, 6b, 6c as well as a fluid shearing out of each broken area, in a very short time during the vehicle impact of an accident, which is roughly about 20 ms. Subsequently, as the force of impact increases, all of the weakened areas 6a-6c are broken sequentially.

The invention, however, does not require that the recesses or weakened areas are different sizes, but instead one recesses/weakened area, or multiple recesses/weakened areas of the same size, can be used.

As shown in FIGS. 4A-7B, according to a second exemplary embodiment of the invention, the crash cushion 100' can be made reusable by using exhaust reed valves 9a, 9b, 9c, an intake reed valve 10, and a fluid reservoir 12. One or more exhaust reed valves 9a, 9b, 9c can built-into the back plate 1.

Figure 4A:
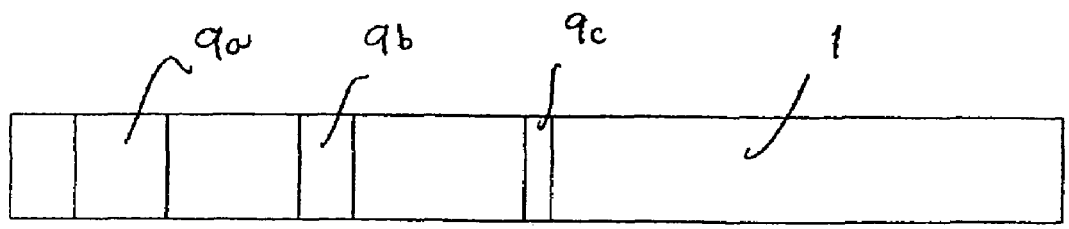
FIGS. 4A and 4B show a second exemplary embodiment of the invention in which the crash cushion includes variable area exhaust-reed valves.
Figure 4B:
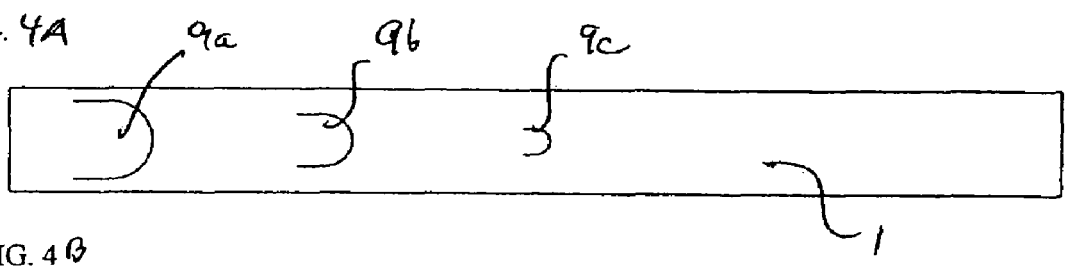
Figure 5A:
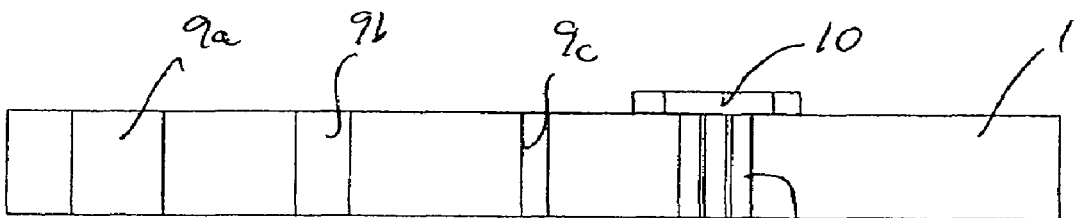
FIGS. 5A-5C show the back plate having multiple exhaust-reed valves and one inlet-reed valve of the second exemplary embodiment.
Figure 5B:
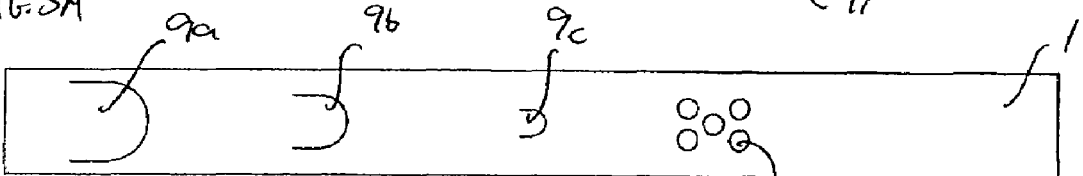
Figure 5C:
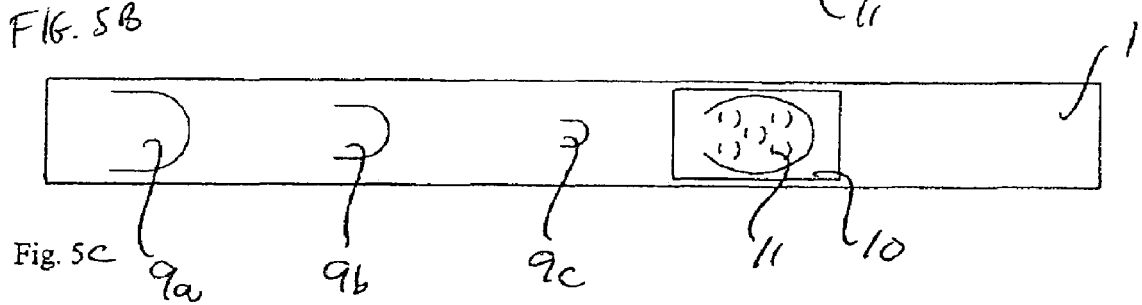

The exhaust reed valves 9a, 9b, 9c are designed to provide a sequential release of the material 4 within the cushion 3. This can be accomplished by providing reed valves 9a, 9b, 9c with varying surface areas, as shown in FIGS. 4A and 4B, or alternatively, providing reed valves 9a, 9b, 9c that have the same surface area, but varying reed valve plate thickness. Moreover, the reed valves 9a, 9b, 9c can have both varying area and varying thickness. The varying surface areas, or plate thicknesses, make it possible for the various exhaust reed valves 9a, 9b, 9c to open in sequence with increasing pressure. It is also possible to produce varying thickness read valves by placing multiple reed valves 9a, 9b, 9c on top of one another.

The exhaust reed valves 9a, 9b, 9c can be provided as part of the back plate 1 or can be placed over the back plate 1. Openings 8 in the back plate 1 provide an exit from the cushion 3. Alternatively, the reed valves 9a, 9b, 9c can be provided without a separate opening in the back plate 1, by forming the reed valves 9a, 9b, 9c that extend the entire width of the back plate 1. In other words, the reed valve or reed valves 9a, 9b, 9c become the bumper back plate 1.

Moreover, in another alternative embodiment, the exhaust reed valves 9 can be used in combination with weakened areas. The applied pressure or force on the cushion 3 would cause the reed valves 9a, 9b, 9c to open and would also cause the weakened area to break.

Figure 7C:
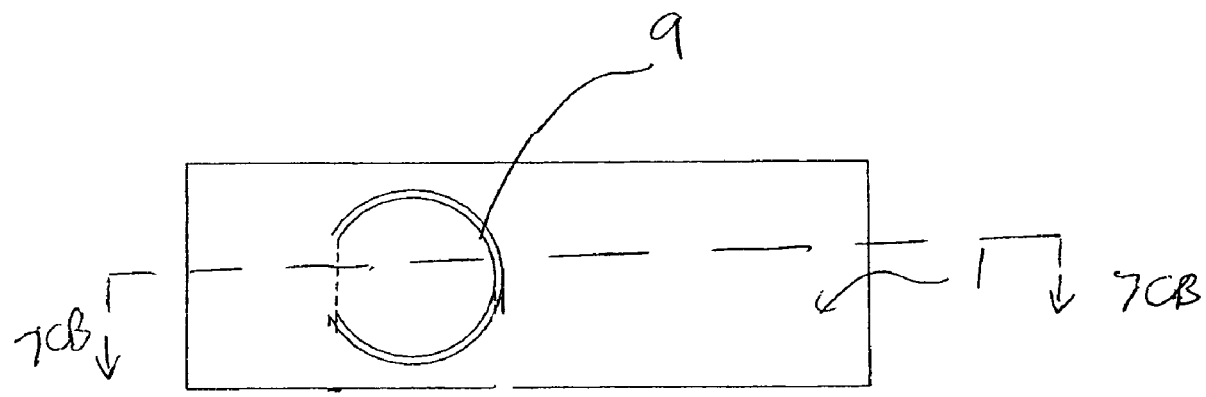
FIG. 7A shows a material reservoir positioned on the back of the back plate.
FIG. 7BA-7CB show alternative aspects of the second embodiment of the invention in which a restriction is used to prevent the inlet reed valve from opening.
Figure 7C:
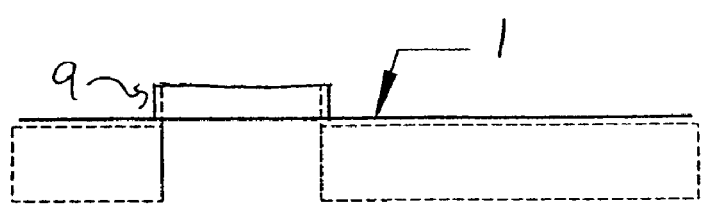

In order to allow the material 4 to return to the cushion 3, which allows the crash cushion 100' to be reusable, an inlet reed valve 10 is placed on the back plate 1. As shown in FIGS. 7A, the inlet reed valve 10 covers multiple small holes 11 built-in the back plate 1. These smaller holes 11 prevent the large inlet reed valve 10 from opening towards the back plate 1. Alternatively, a restriction 11' can be provided within a larger hole to prevent the inlet reed valve 10 from opening towards the back plate 1, as shown in FIG. 7BA and 7BB. Moreover, as shown in FIGS. 7CA and 7CB, the restriction can be provided by an opening in the back plate 1 that is smaller than the inlet reed valve 10.

However, if a force is applied on the inlet reed valve 10 in the opposite direction (i.e., a force coming through the small holes 11) in the bumper back plate 1, the inlet reed valve 10 would open in the opposite direction, away from the bumper back plate 1. There is no restriction to the inlet reed valve 10 opening in this direction.

However, pressurized escaping material 4 contained in the crash cushion 100' would not be able to open a one way, less restrictive (i.e., easily bendable) inlet reed valve 10, since pressurized fluid would be pushing the one-way inlet reed valve 10 against the smaller holes 11, preventing the inlet reed valve 10 from opening.

In this way, the one-way inlet reed valve 10 blocks exhaust material 4 coming out of the cushion 3, and allows the return of the material back into the cushion 3.

As shown in FIGS. 4-7B, with increasing material pressure due to an impact, varying area but same plate thickness exhaust reed valves 9 open in sequence, starting with the largest area exhaust reed valve 9a and continuing to the smaller area exhaust read valves 9b, 9c, letting material 4 escape out of the cushion 3. Each time an exhaust reed valve 9a, 9b, 9c opens, more material 4 is allowed to escape from the cushion, thus providing more shearing, and therefore more energy absorption.

The invention, however, does not require that the reed valves are different sizes, but instead a single reed valve, or multiple reed valves of the same size, can be used.

Figure 8A:
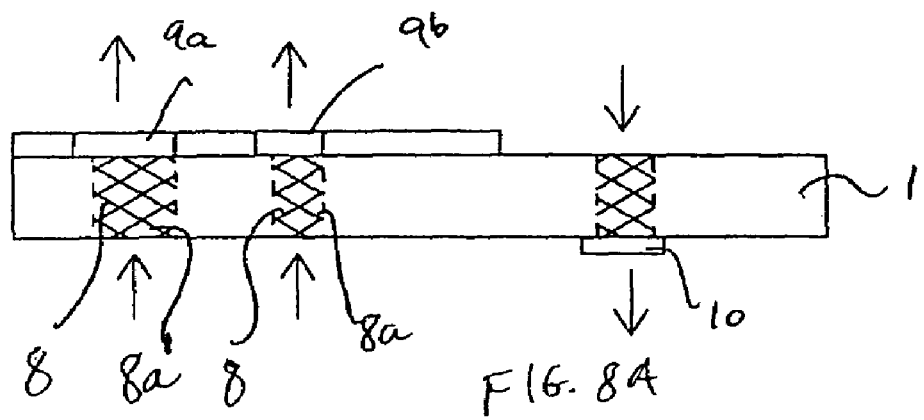
FIGS. 8A-8C shows an alternative aspect of the second embodiment in which the crash cushion includes a conical spring, a pressurized protective cover, and reinforcement piece.
Figure 8B:
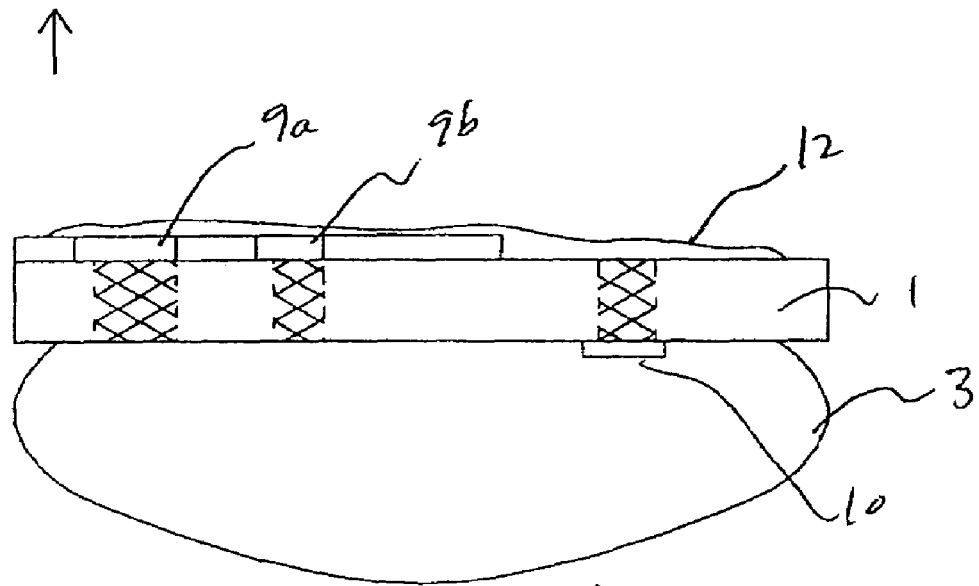
Figure 8C:
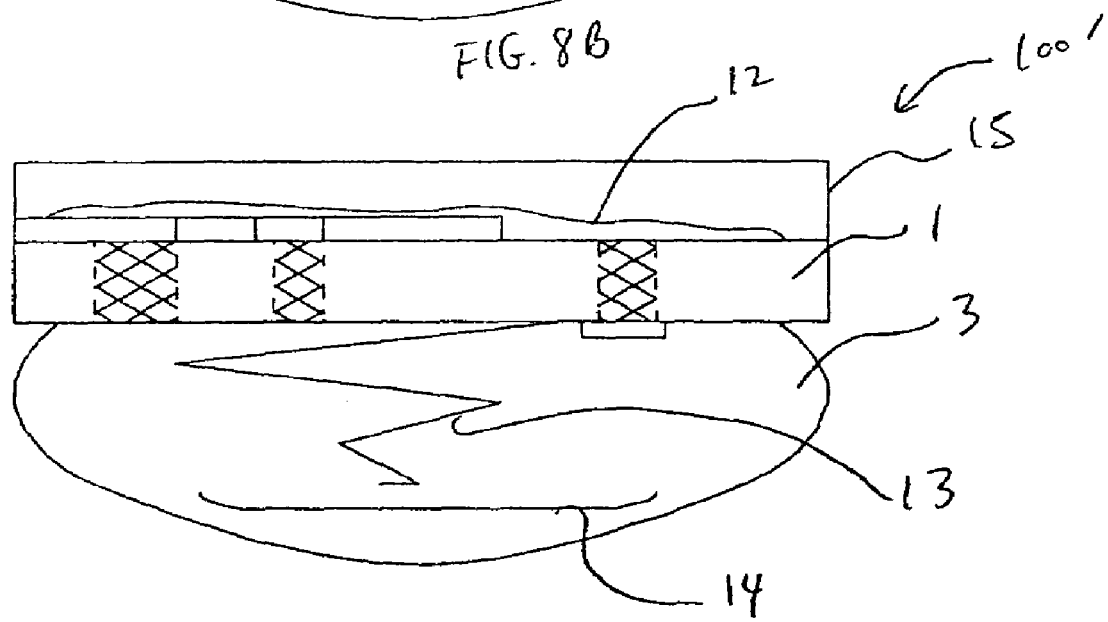
Figure 9:
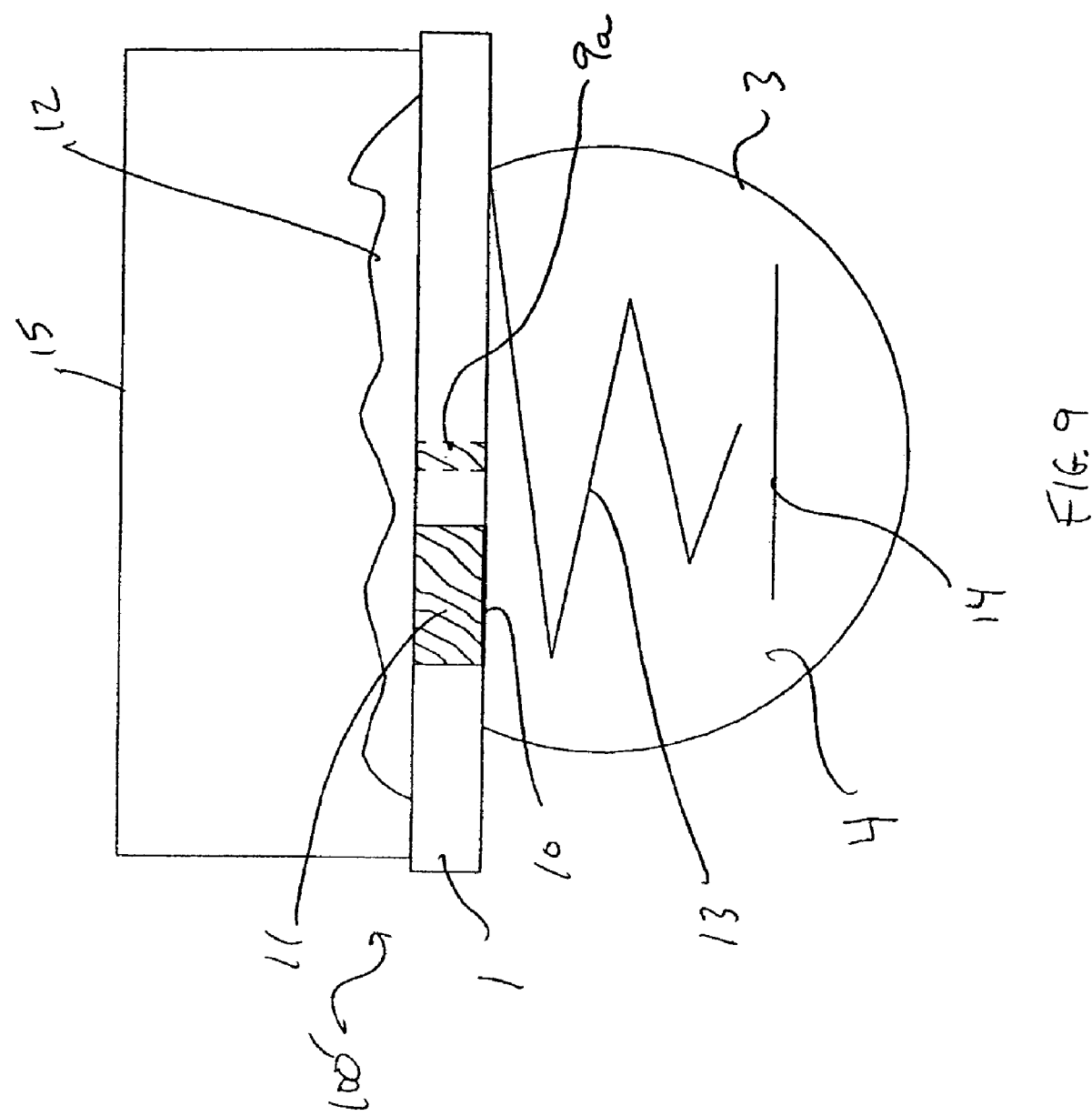
FIG. 9 is another aspect of the second embodiment in which a pressurized protective cover is used to assist with the return of material to the cushion.

As shown in FIGS. 8A-8C, according to one aspect of the second exemplary embodiment, escaping material 4 is collected in a collection reservoir 12. The collection reservoir covers the back side of the bumper back plate 1, or the side opposite the cushion 3, which covers the front side of the bumper back plate 1.

Before use, the reservoir 12 is preferably at a vacuum to insure that the escaped material 4, and not air, will return back into the cushion 3. Moreover, the vacuum allows the collection reservoir 12 to contract after the impact force is removed. This contraction forces the material 4 back into the cushion 3 via the less restrictive one-way inlet reed valve 10, allowing the cushion 100' to be reusable.

The reservoir 12 is preferably a bag that is both flexible and elastic, or enlargeable, in order to allow the bag to expand and contract. However, the fluid reservoir 12 could be, for example, a can, a box or a stretchable, flexible, elastic, enlargeable balloon.

As shown in FIGS. 8A-8C, according to one aspect of the second embodiment (or, alternatively, the first embodiment), the cushion 3 includes a conical spring 13 placed between the front of the bumper back plate 1 and a reinforcement pieces, such as a protective plate 14. The use of a conical spring 13 allows the layers of the conical spring 13 to nest one inside another in a common plane when the spring is compressed. The reinforcement piece 14 is placed between the conical spring 13 and the surface of the cushion 3 in order to prevent rupture of the cushion during an impact. Another reinforcement piece could also be placed in front of the cushion 3 to protect the cushion during impact. Moreover, the spring 13 can be used without the reinforcement piece 14.

The spring 13 would compress during an accident, thereby absorbing some impact energy. Moreover, after the impact force is removed, the spring 13 will expand, forcing the cushion 3 to enlarge. The reduction in pressure within the enlarging cushion 3 will draw material 4 back into the cushion 3 from the collection reservoir 12, assuming that there is no excess air within the cushion 3 and the collection reservoir 12.

As shown in FIGS. 8A-8C and 9, to further assist the return of material from the collection reservoir 12 back into the cushion 3 after an impact, a pressurized protective cover 15 can be placed behind the collection reservoir 12. The pressurized reservoir 15 will absorb some impact energy by providing a pressure that allows the vacuum collection reservoir 12 to resist expansion. This pressure helps force the material 4 return back into the cushion 3 after the impact force is removed.

In this aspect of the second embodiment, a protective mesh can be provided in the openings 8 in order to prevent the inlet valve 10 from bending backwards.

Figure 10:
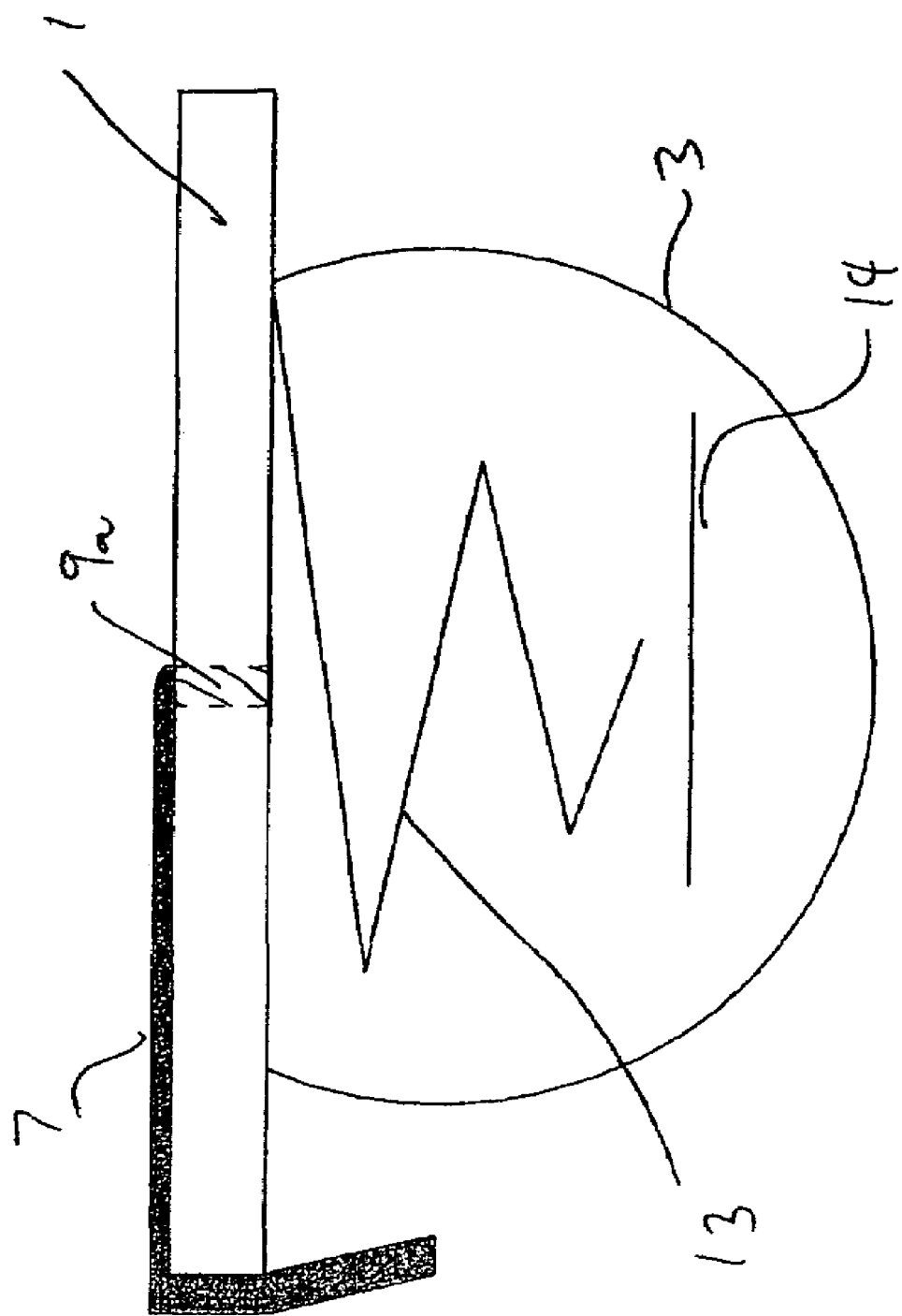
FIG. 10 shows the use of escaping material from the cushion that is directed towards an oncoming vehicle, to reduce the vehicle's impact force.

As shown in FIG. 10, in either of the first and second embodiments of the crash cushion, escaping material from the cushion 3 can be directed back onto the impacting vehicle via an escape canal 7. By directing the material in this way, a portion of an oncoming vehicle's own impact force can be used against itself. Because the power of an oncoming vehicle is used against itself, there is a partial reversal of the incoming force.

Figure 11A:
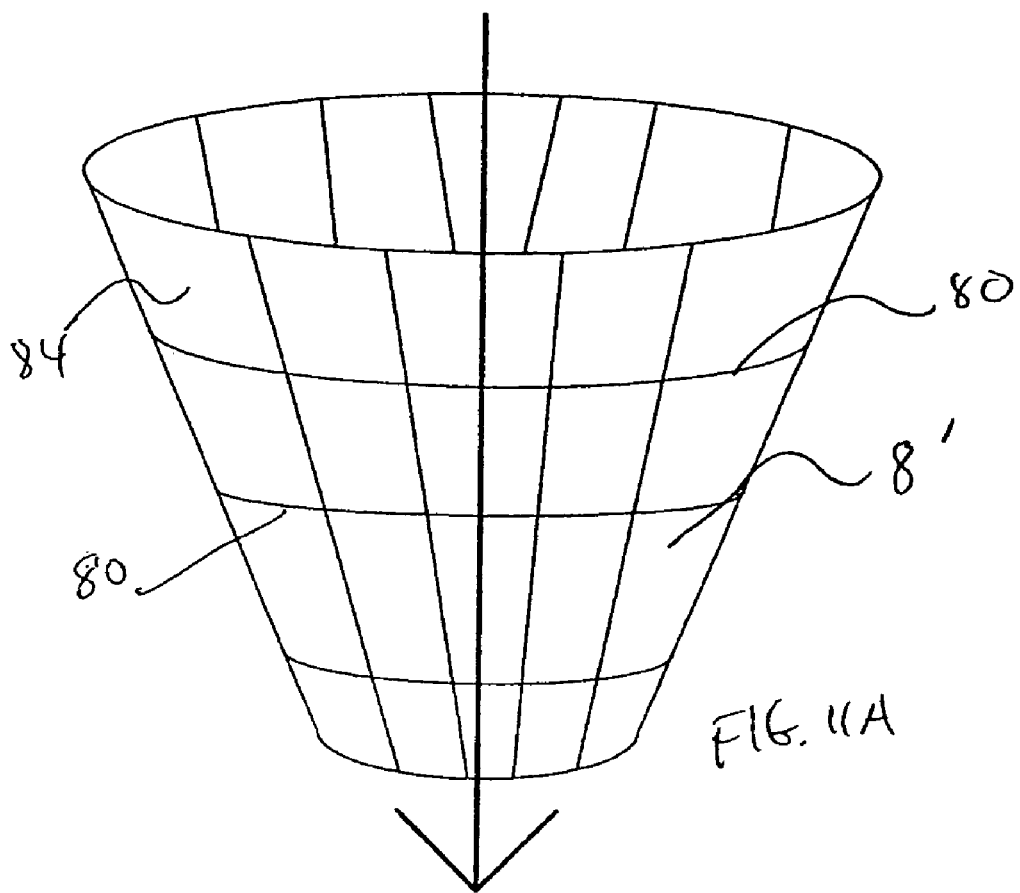
FIGS. 11A and 11B show an expandable or variable orifice nozzle for further fluid shearing.
Figure 11B:
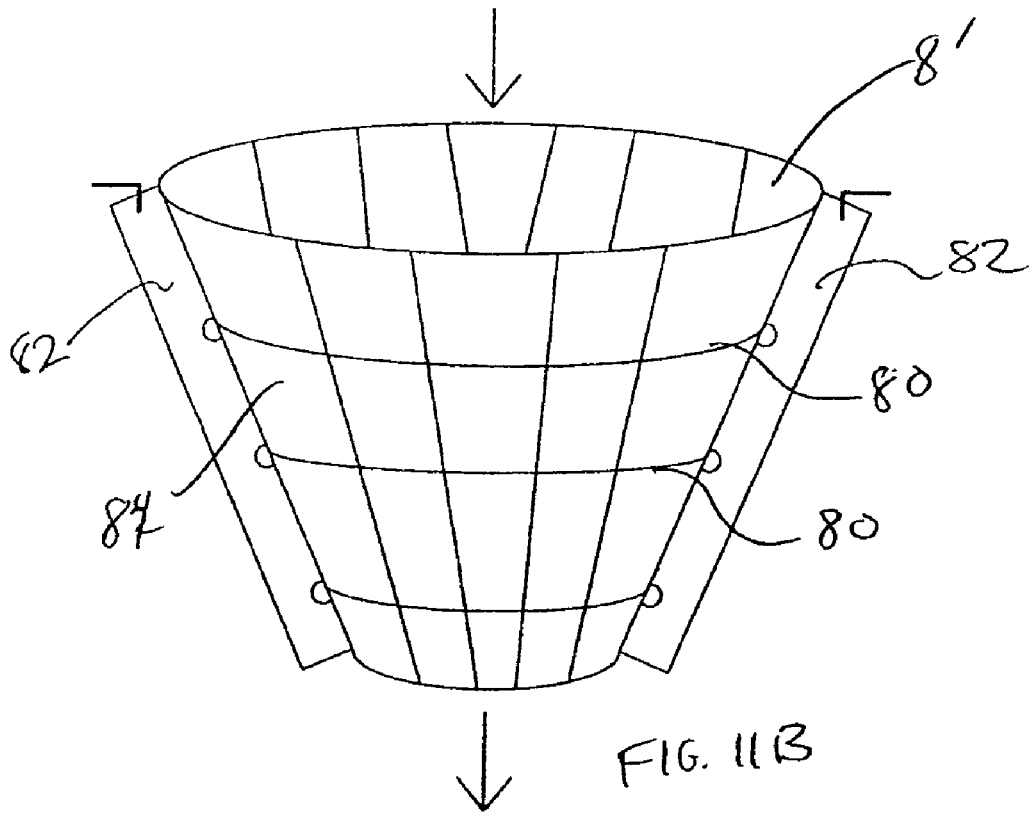

Moreover, as shown in FIGS. 11A-11B, it is possible to use a nozzle 8' (or multiple nozzles) for controlling the area of an orifice of an opening 8 in the back plate 1 of the second embodiment. The opening orifice area of these nozzles 8' can be designed to change based on the pressure of material 4 escaping from the opening. Welded beams 82 can be used to hold the "C" rings 80 in place. Plates 84 are provided within the "C" rings.

As shown in FIG. 11B, this can be accomplished by, for example, using two "C" rings 80 placed on top of one another arranged at positions that are 180 degrees from one another. The "C" rings 80 allow the plates 84 of the slidable nozzle 8' to open, therefore enlarging the area of the opening.

Moreover, it is also possible to form the weakened areas 6a, 6b, 6c, provided at the end of the recesses 5a, 5b, 5c, shown in FIGS. 2A and 2B, with a nozzle shape. This could be accomplished by providing tiny cuts or slits on the weakened area that would be engineered to rip open along the cut lines. Thus, the weakened area could break in nozzle shapes, which would absorb some of the impact pressure.

In another embodiment, it is possible to use a metal crash cushion. In a computer simulation, a metal was used as to make the flexible cushion. The metal can be specially designed to bend, crumble, but not shatter, or cause a leak by ripping, or cutting. In addition, as shown in FIG. 12, a criss-crossed wire harness 23 can be used to strengthen the crash cushion 100 from a side impact. This structure prevents the side impact from ripping or shearing the cushion 3 from the back plate 1.

As shown in FIGS. 13A and 13B, additional layers of orifices 24 could be placed before or after the exhaust read valves 9, to provide further fluid shearing, and therefore energy dissipation. Alternatively, as shown in FIG. 13C, a mesh 24', or screen layer, on top of the back plate 1 could be used to further increase fluid sheering.

FIGS. 14A and 14B show indentations 26 engineered on the reed valve 9 in order to strengthen the bending of reed valve without increasing the thickness of metal reed valve. The indentations also reduce the weight of the back plate.

Figure 15:
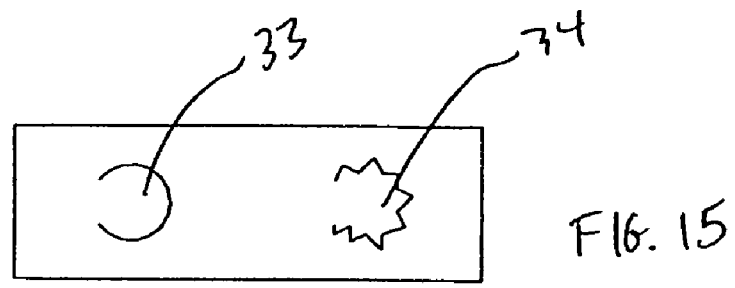
FIG. 15 shows regular reed valve with smooth surfaces and a rough surface reed valve.

FIG. 15 shows a regular smooth cut reed valve 33 compared with a rough-cut reed valve 34. The shearing area is increased in the rough-cut reed valve 34.

Figure 16A:
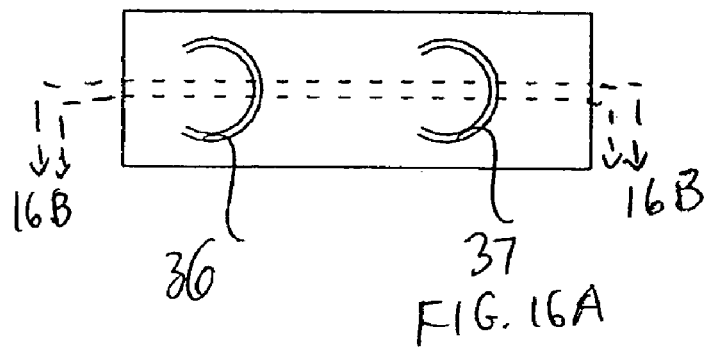
FIGS. 16A-16C show a cut reed valve, in which the back plate includes an opening, and a recess formed reed valve.
Figure 16B:
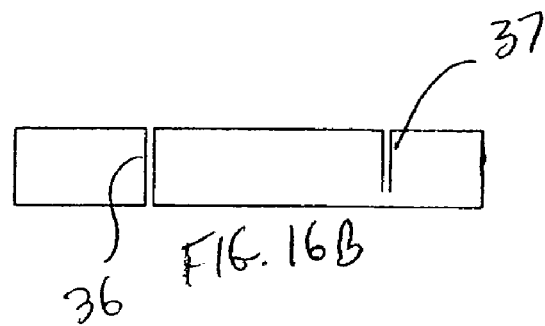
Figure 16C:
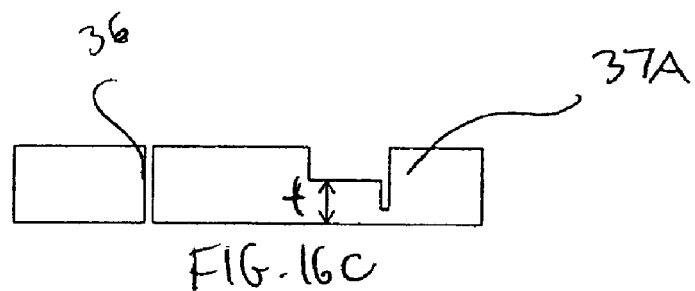

FIG. 16A shows a back plate with a cut-open reed valve 36 and a recess formed reed valve 37. FIG. 16B shows a side view of a portion of back plate cut along the lines 16B-16B in FIG. 16A. FIG. 16C shows a cut-open reed valve 36 and a recess formed reed valve 37A, which has a thickness t that is smaller than the thickness of the back plate.

Figure 17:
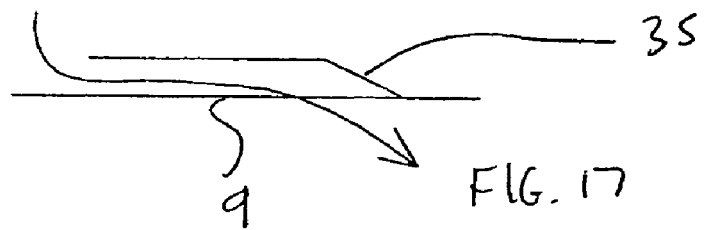
FIG. 17 shows a canal that can be used for increasing the shearing in the reed valve.

FIG. 17 shows an added canal 35, which provides increased shearing through reed valve 9. This canal 35 could be on either side of the back plate 1. The canal 35 provides increased shearing due to the water passing through the walls of the canal 35.

Figure 18A:
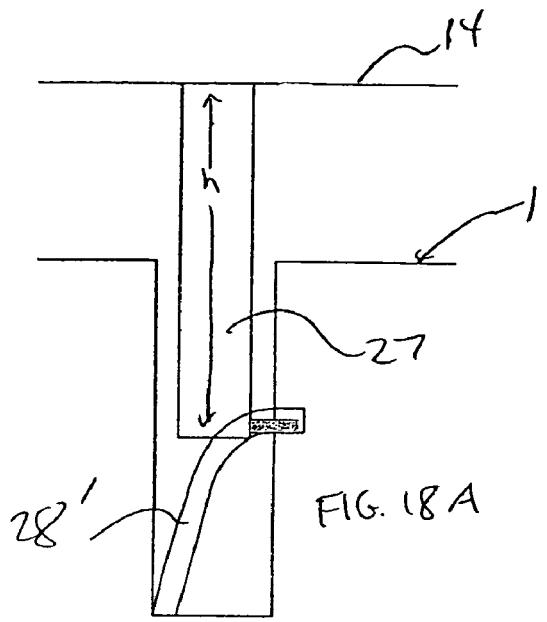
FIGS. 18A-18DC show how a torsion bar can be used with the crash cushion in place of the conical spring.
Figure 18B:
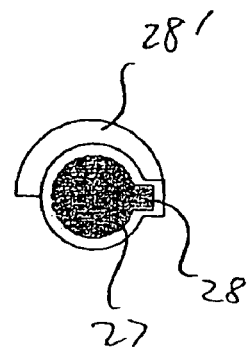
Figure 18C:
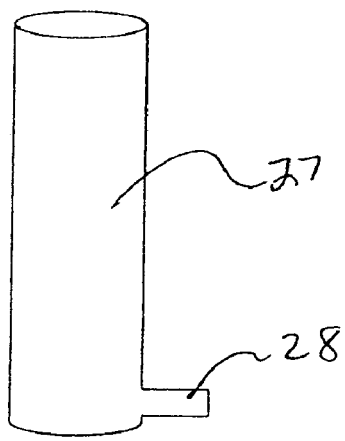

FIGS. 18A-18C show a torsion bar 27 that can be used in place of the conical spring 13 of the second embodiment, in order to reduce the weight of the crash cushion 100'. In order to reduce wear, due to vehicle vibration, the torsion bar 27 should be assembled in the cushion at a tension. As shown in FIG. 18A, the torsion bar 27 should have a height h that is greater than the back plate 1. This additional height allows the torsion bar 27 to have extra length when it is rotated and moves downward.

As shown in FIGS. 18A-18C, the torsion bar 27 is provided to with a pin 28. When the reinforcement piece 14 is subject to an impact force, the torsion bar 27 is displaced in the direction of the impact force as the pin 28 moves down a twisting groove 28'. The torsion bar 27 is preferably designed to move further downward if the torsion groove 28' is longer, and to move a shorter distance downward if the torsion groove 28' is shorter, because a shorter groove 28' may be much harder to twist.

Figure 18D:
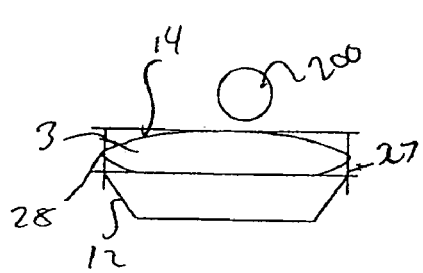
Figure 18D:
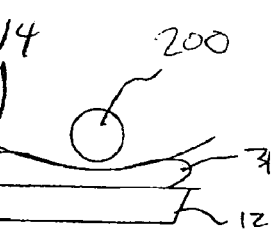
Figure 18D:
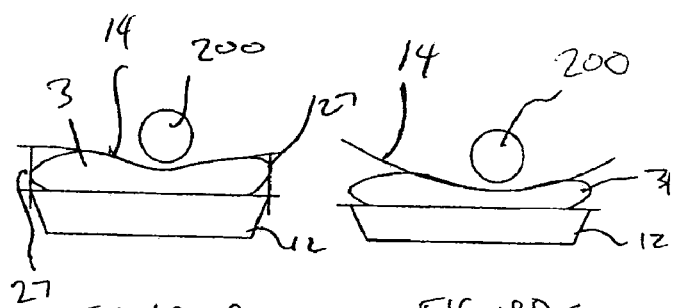
Figure 18E:
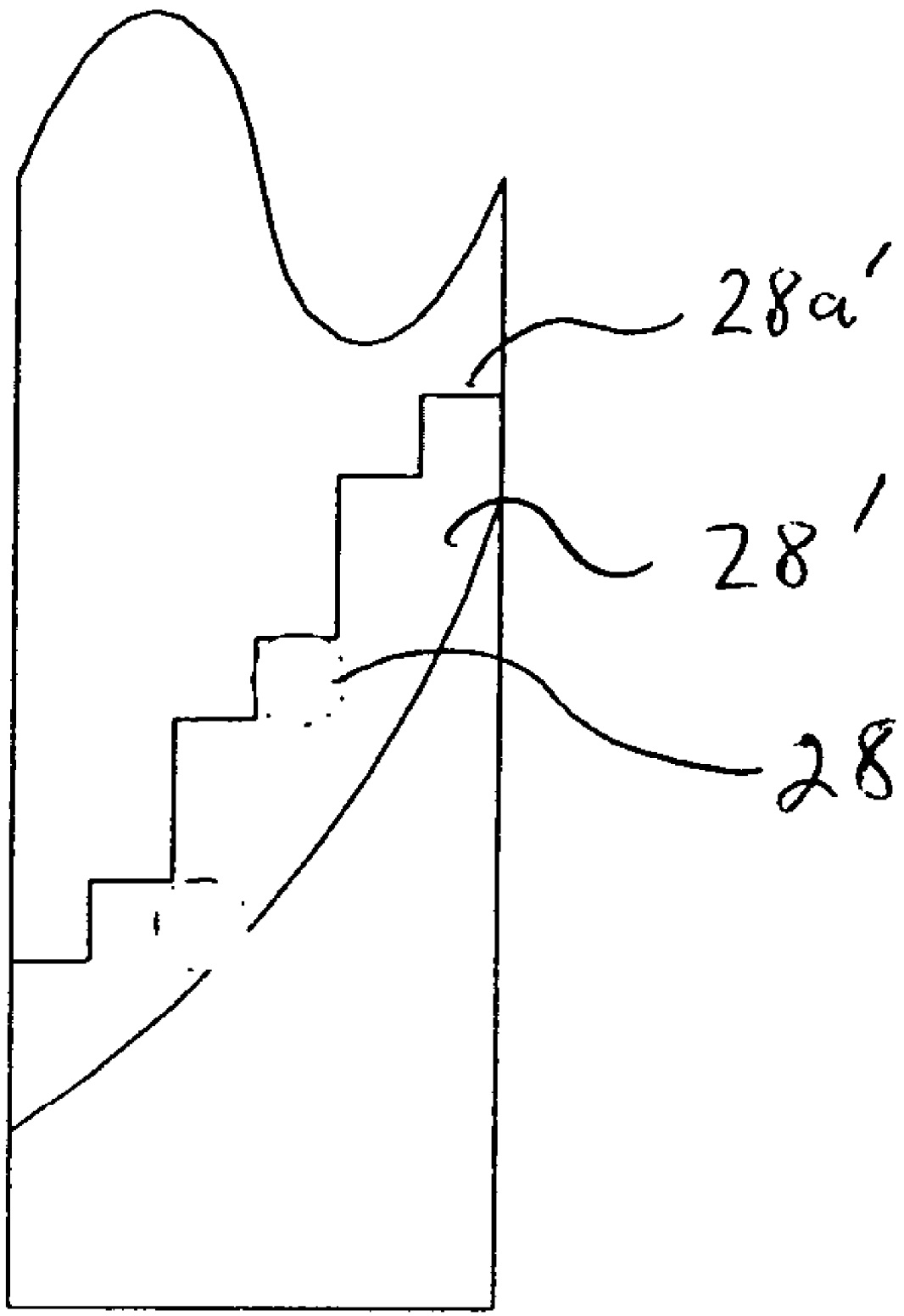

Moreover, in another aspect of the invention shown in FIG. 18E, the groove 28' would stay the same except the top part of the 28' would not be smooth, but like a stairway 28a'. This way when the torsion bar 27 is under pressure during an accident, then the torsion bar pin 28 slides on the bottom edge of the groove 28'. After the accident, when the pressure is released on the torsion bar pin 28, the pin slides on the upper part of the torsion bar groove 28'. Therefore, the torsion bar 27 would get stuck and not move up. This way the torsion bar 27 would absorb the impact force without relaxing. In contrast, a spring does not absorb force. Instead, it relaxes and releases the absorbed energy. Thus, with this stair like conception 28a', the torsion bar pin 28 can slide down the groove 28', but not up the groove 28'.

The torsion bar 27 and reinforcement plate 14 provide additional energy absorption. This energy absorption could possibly prevent the back plate 1 from curving outward during a collision. For example, as shown in FIG. 18DC, without a torsion bar 27, a collision of a vehicle with a light pole 200 might force the back plate 1 to curve outward, which would rip the cushion 3 from the back plate 1. However, as shown in FIGS. 18DA and 18DB, if the torsion bar 27 is pinned to the reinforcement plate 14, this the structural integrity of the crash cushion is improved. The torsion bar 27 could also act as an energy absorbing bumper by itself if all the other parts of the crash cushion fail.

Figures 19A, 19B:
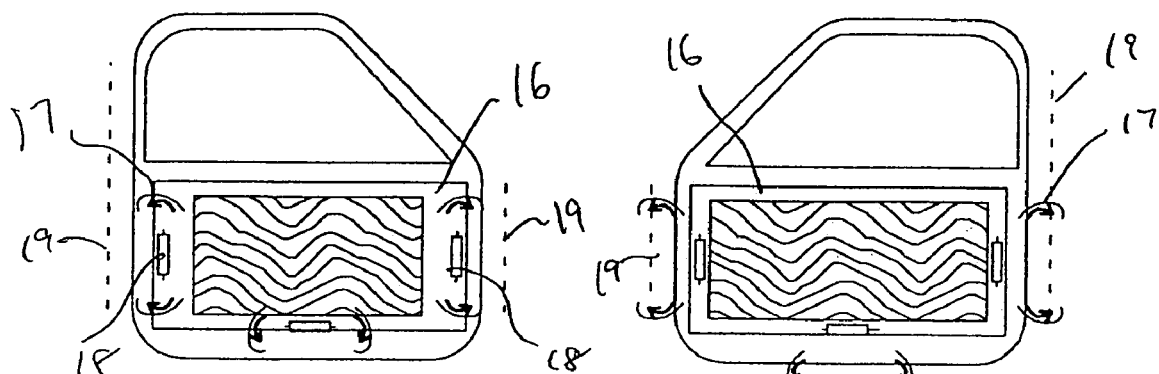
FIGS. 19A and 19B show a crash cushion used as a vehicle door.

Either of the embodiments can also be used as a side impact energy absorbing device, by replacing a bar inside a door panel. As shown in FIGS. 19A and 19B, the cushion's back plate 16 can be connected to hooks 17 that are activated by simple contact switch (or switches), a crash sensor, or a membrane switch (or switches). The sensor or switch is placed in an appropriate location, so that the sensor or switch is capable of sensing an incoming impact and energizes actuators during an impact. As shown in FIG. 19B, these actuators 18 push the hooks 17 into door beams 19, or frame posts, thus locking or anchoring the back plate 16 into the door beams 19 from the sides as well as from the bottom.

Figures 20A, 20B:
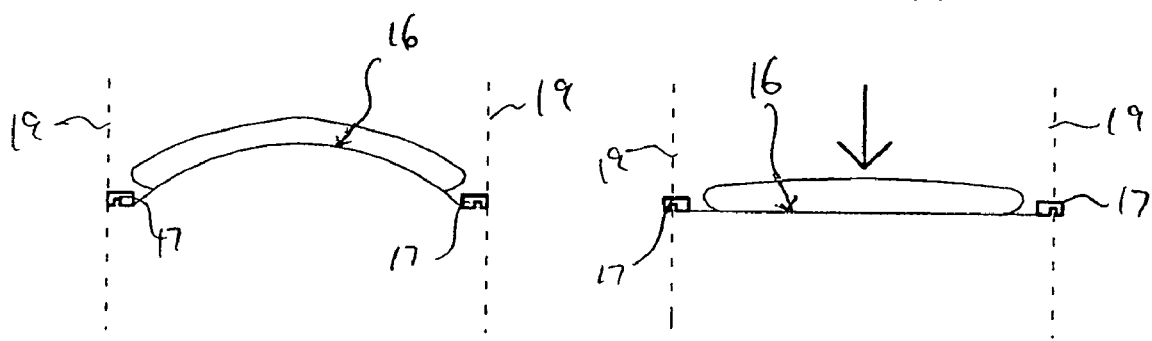
FIGS. 20A and 20B show a crash cushion that is curved and which flattens and enlarges its width during an impact, allowing it to anchor hooks into side door beams for added support for the back plate.

As shown in FIGS. 20A and 20B, the back plate 16 could also be curved, so that upon impact, the outwardly curvature would flatten, thus enlarging the width (and/or the length, depending on curvature design) of the back plate 16, which will push the hooks 17 so that they engage the door beams 19. Thus, the back plate 16 anchors itself to the door beams 19 (or door posts, or door frame) of the car. This allows the crash cushion to absorb impact energy by strengthening the back plate 16, which should be designed to resist bending.

Figure 21:
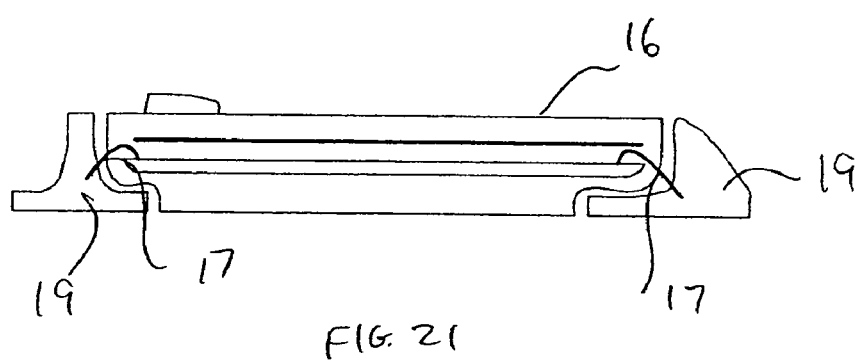
FIG. 21 shows a side impact crash cushion back plate resting on door beams for adsorbing side impact.

Moreover, the impact force would push the back plate 16 against the door beams 19, anchoring the hooks 17 into the door beams 19. FIGS. 21 shows a back plate 16 resting on door beams 19. This resting stability is enhanced by using hooks 17 to hook the back plate 16 to the door beams 19.

FIGS. 22A-22C, 23A-23C, and 24 show several ways to strengthen the back plate's connection with a car chassis. For example, FIGS. 22A-22C show a protective cover 15 bolted to the chassis with screws or bolts 15'. The back plate 1 can include ear-like sticking extensions 15" around the protective reservoir 15 and cushion 3 in order to form a support trust that resist bending connected with a screw or bolt 15 to the car chassis. Holes or openings in the protective reservoir 15 and/or back plate 1 are provided for the screws or bolts 15.

Figure 23B:
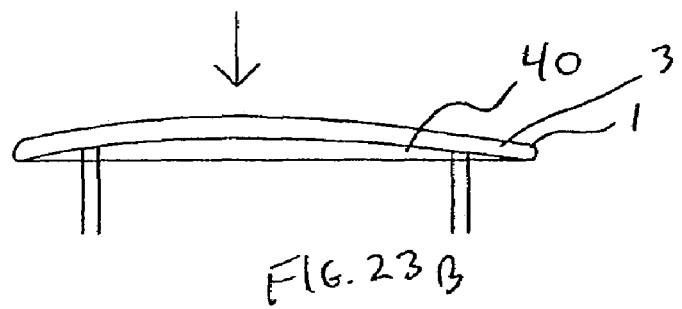

Moreover, FIGS. 23A and 23B show a string 40 that is used to support the crash cushion to the chassis. As shown in FIG. 23B, when the cushion 3 is subjected to an impact force, the string 40 flattens, providing energy absorption.

Figure 23C:
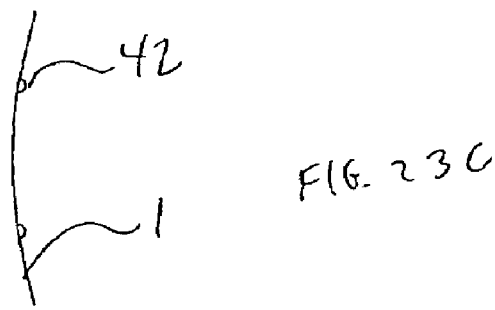
FIGS. 23C and 23D show the back plate with indentations used to provide added structural support.
Figure 23D:
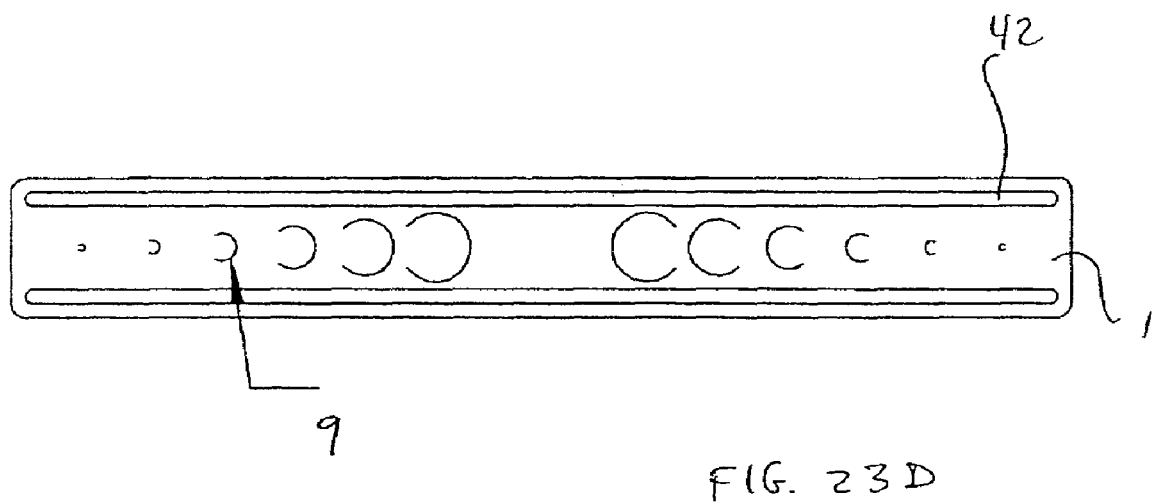

Finally, as shown in FIGS. 23C and 23D, indentations 42 can be used to provide added structural support to the back plate 1.

Figure 24A:
FIGS. 24A-24B shows another crash cushion designed with a structural support that provides structural strength for connecting the back plate to a car chassis.
Figure 24B:
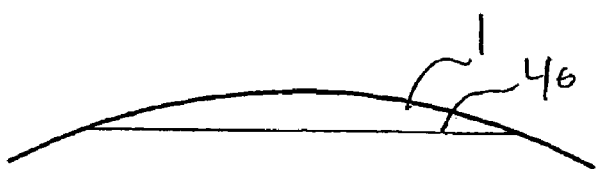

FIGS. 24A and 24B show another crash cushion designed with a structural support 40 that provides structural strength for connecting the back plate 1 to a car chassis.

Figure 26:
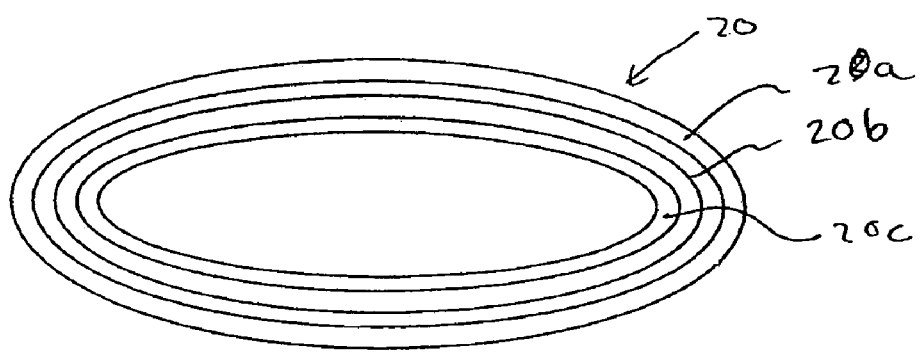
FIG. 26 shows another crash cushion in which multiple layers stacked on top of one another.

FIG. 26 shows a third embodiment of the crash cushion 100" in which a cushion 20 (e.g., a bag structure) has a wall structure with multiple layers 20a, 20b. As shown in FIGS. 27A-27C, each layer 20a, 20b, 20c contains one or multiple weakened areas 6'. These weakened areas 6' can be varying depth recesses 5' carved on the cushion 20. During an impact, pressurized material 4 within the cushion 20 would break open the weakened areas 6', discharging fluid, or shearing fluid via weakened areas 6'.

Figure 25:
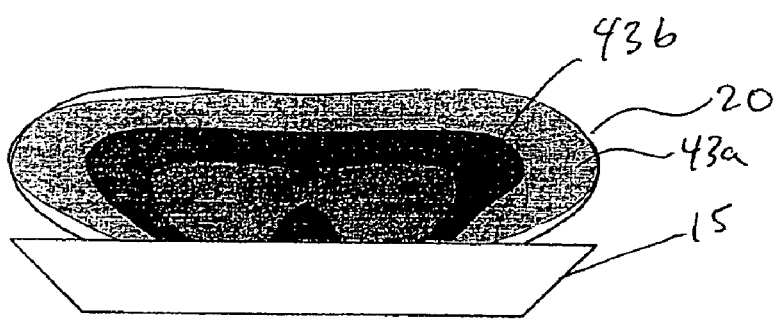
FIG. 25 shows a crash cushion with multiple regions, each region having a gel with a different viscosity.

As shown in FIG. 25, within the multiple layers 20a, 20b, 20c can be provided gel materials with different viscosities, but the invention is not limited in this respect. The different viscosity gel reservoirs 43a, 43b can be connected respectively to the reed valves. Thus, only the amount of energy of a single gel material will be dissipated when the reed valve opens. If the amount of energy exceeds that amount, then the reed valve for the next higher viscosity gel reservoir 43 functions. Therefore, the energy is dissipated sequentially. It is also possible to have multiple same strength reed valves on a single gel reservoir 43.

As shown in FIGS. 27A-27C, a mesh layer 21 (or a screen harness) can be provided within the cushion 20 in order to strengthen the properties of the cushion 20. This mesh layer 21 could be made out of Kevlar and is preferably used as a first and/or last layer of the cushion 20. Moreover, the crash cushion could also be covered with a protective layer 22, such as a Kevlar or Teflon layer.

A Kevlar layer could be sandwiched between polyurethane layers and used as armor for absorbing impact energy of an incoming bullet, or explosion. For example, such a cushion could be used for covering a portion of a tank or a building.

Moreover, a protective layer 22 of for example, Teflon, can be applied to the inner layer of the cushion to prevent deterioration due to contact with Silicon (Si) or gel, or other semi-solid material. The interior surface of the cushion 20 can also be made rough, to facilitate Teflon sticking to the cushion 20.

In addition, when the cushion 20 is being produced, the inside of the cushion 3 can include a sticky layer of tape, such as duct tape. After the cooling of the cushion 3, the duct tape could be peeled off, leaving a rough inner surface, where Teflon may be applied. In addition, an abrasive material, like sand, could be blasted onto the inner surface of the cushion 20 to leave a rough inner surface where Teflon may be applied.

As shown in FIG. 28, the crash cushion 100 can be provided as the rear or front fascia of a car. If the crash cushion is used in this way, the crash cushion 100 can be provided with openings for structures of the vehicle that are prone to collisions (such as a grill 44, a lamp 46, or turn signal). Moreover, as discussed above, the crash cushion can be applied to different roadside structures that could be subject to a collision, such as being wrapped around a tree trunk or a bridge column.

FIGS. 29A and 29B are schematics showing the operation of reed valves 9 that can be used in the second exemplary embodiment of the invention. The exemplary reed 9 shown in FIGS. 29A and 29B can be a metal piece with a cut open area 90. The connected part of the valve 92 can be a thin metal piece. The reed valves 9 are biased in an upward direction of 29B which is the direction opposite the direction of flow of material 4 the cushion.

Figure 30A:
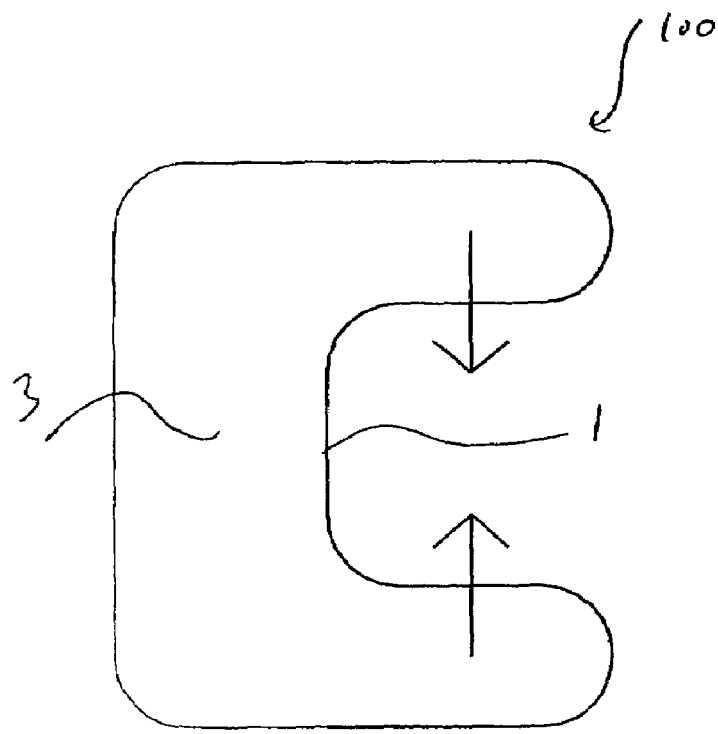
FIGS. 30A, 30B and 30C show details of an exemplary reed valve that can be used in the second exemplary embodiment of the invention.
Figure 30B:
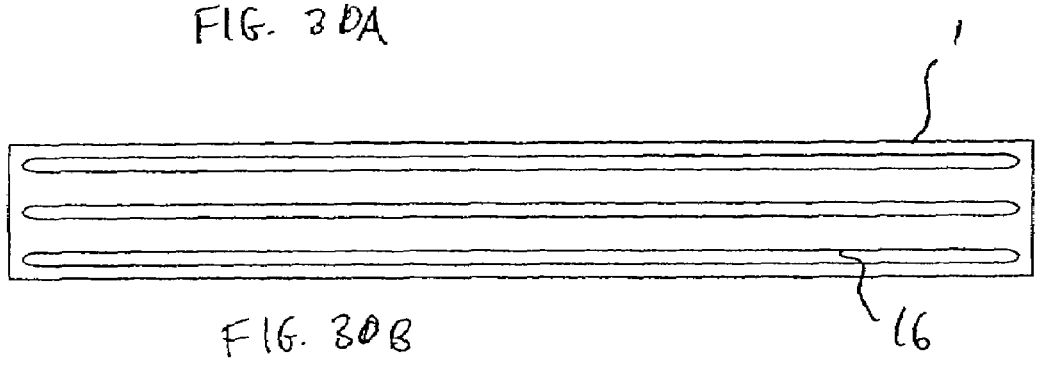
Figure 30C:
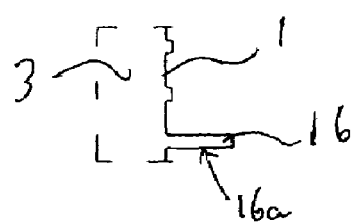

Finally, as shown in FIGS. 30A-30C the crash cushion 100 can be arranged so that the material 4 escapes from the cushion 3 at a direction that is 90 degrees from the direction of impact on the crash cushion. In this way, the force of the exiting material 4 would not oppose the impact on the cushion 3, but would instead be redirected at 90 degrees. In initial computer simulations of this embodiment, the exiting speed of water (as the material 4) was 12 to 16 km/hr. FIGS. 30A-30C show the front and side, respectively, of another exemplary embodiment. The material 4 exits from the cushion 3 at a 90-degree angle via a weakened area 16a in a protrusion 16 of back plate 1.

A computer simulation has conformed the basic concept and idea of some of the various crash cushions discussed above. The invention is based on the principles of kinetic energy from the impacting mass being converted into other forms of energy. This can be the deformation of the material within the cushion, as well as metal or the friction energy that is lost when fluid or gels goes through valves.

Assuming that the area of a back plate without the reed valves is considered as area A and the pressure P on the back plate is uniform, the force F exerted on a car chassis can be calculated as $F = P \times A$. Therefore, the pressure of the gel can be controlled by controlling reed valve openings and sizes. Thus, the force exerted on the vehicle chassis will depend on, and be controlled by, the number and size of reed valve openings, and/or the number and size of the weakened portions. Thus, if the area of the valve openings are designed carefully and thoughtfully, then the weight of the bumper back plate can be reduced, thus reducing the structural mass of the vehicle and providing some savings in gas consumption.

It is of course understood that departures can be made from the preferred embodiment of the invention by those of ordinary skill in the art without departing from the spirit and scope of the invention that is limited only by the following claims.

What is claimed is:

1. A crash cushion, comprising:
   a cushion filled with material; and
   a back plate including at least one recess communicating with a back of said cushion such that said material from said cushion fills said recess; wherein said back plate is configured so that when a force is applied to said cushion, the material within said at least one recess breaks a portion of said back plate and exits said at least one recess.

2. The crash cushion of claim 1, wherein said at least one recess is a plurality of recesses communicating with a back of said cushion such that said material from said cushion fills said recesses;
   wherein said back plate is configured so that when a force greater than a first predetermined value is applied to said cushion, the material within a first of said plurality of recesses breaks a first portion of said back plate and exits said first recess; and when a force greater than a second predetermined value is applied to said cushion, the material within a second of said plurality of recess breaks a second portion of said back plate and exits said second recess, said second predetermined value being greater than said first predetermined value.

3. The crash cushion of claim 2, wherein the first recess has a greater depth or a greater area than the second recess.

4. The crash cushion of claim 3, wherein said material is a gel.

5. The crash cushion of claim 3, wherein said material is solid, and becomes a fluid when the force greater than said first predetermined force is applied to said cushion.

6. The crash cushion of claim 3, wherein said material is a fluid.

7. A vehicle bumper, comprising a crash cushion wherein said crash cushion comprises:
   a cushion filled with material; and
   a back plate including at least one recess communicating with a back of said cushion such that said material from said cushion fills said recess; wherein said back plate is configured so that when a force is applied to said cushion, the material within said at least one recess breaks a portion of said back plate and exits said at least one recess,
   wherein said at least one recess is a plurality of recesses communicating with a back of said cushion such that said material from said cushion fills said recesses; and
   wherein said back plate is configured so that when a force greater than a first predetermined value is applied to said cushion, the material within a first of said plurality of recesses breaks a first portion of said back plate and exits said first recess; and when a force greater than a second predetermined value is applied to said cushion, the material within a second of said plurality of recess breaks a second portion of said back plate and exits said second recess, said second predetermined value being greater than said first predetermined value.

8. A crash cushion, comprising:
   a cushion filled with material;
   a back plate; including at least one opening communicating with a back of said cushion; and
   at least one valve; wherein said at least one valve is configured so that when a force is applied to said cushion, a portion of the material within the cushion opens the at least one valve and exits said cushion.

9. The crash cushion of claim 8, wherein said at least one opening is a plurality of openings communicating with a back of said cushion; and
   said at least one valve is a plurality of valves, wherein said valves are configured so that when a force greater than a first predetermined value is applied to said cushion, a portion of the material within the cushion opens a first of the valves and exits said cushion; and when a force greater than a second predetermined value is applied to said cushion, another portion of the material within the cushion opens a second of the valves and exits said cushion.

10. The crash cushion of claim 9, wherein the first valve has a greater thickness or a greater area than the second valve.

11. The crash cushion of claim 10, wherein the plurality of valves are reed valves.

12. The crash cushion of claim 10, further comprising a reservoir provided at a side of the back plate opposite the cushion; wherein said material that exits the cushion enters the reservoir.

13. The crash cushion of claim 12, wherein the cushion and reservoir are made of flexible material.

14. The crash cushion of claim 12, wherein the reservoir is provided at a vacuum, and the material returns to the cushion through a return valve when the impact is removed, in order to provide a reusable crash cushion.

15. The crash cushion of claim 14, wherein the plurality of valves and the return valve are reed valves.

16. The crash cushion of claim 9, wherein said material is a gel.

17. The crash cushion of claim 9, wherein said material is solid, and becomes a fluid when the force greater than said first predetermined force is applied to said cushion.

18. The crash cushion of claim 9, wherein said material is a fluid.

19. A vehicle bumper, comprising a crash cushion, wherein the crash cushion comprises:
a cushion filled with material;
a back plate; including at least one opening communicating with a back of said cushion; and
at least one valve; wherein said at least one valve is configured so that when a force is applied to said cushion, a portion of the material within the cushion opens the at least one valve and exits said cushion,
wherein said at least one opening is a plurality of openings communicating with a back of said cushion; and
wherein said at least one valve is a plurality of valves, wherein said valves are configured so that when a force greater than a first predetermined value is applied to said cushion, a portion of the material within the cushion opens a first of the valves and exits said cushion; and when a force greater than a second predetermined value is applied to said cushion, another portion of the material within the cushion opens a second of the valves and exits said cushion.

20. The crash cushion of claim 12, further comprising a protective cover that is provided within said cushion.

21. The crash cushion of claim 20, further comprising a spring, wherein said spring is provided within said cushion and is biased against said protective cover.

22. The crash cushion of claim 15, wherein at least one of said reed valves includes indentations.

23. The crash cushion of claim 2, further comprising an escape canal, wherein said material that has exited the cushion is directed back toward the source of the impact force.

24. The crash cushion of claim 9, further comprising an escape canal, wherein said material that has exited the cushion is directed back toward the source of the impact force.

25. The crash cushion of claim 9, further comprising a shear plate or screen provided on at least one of said plurality of valves.

26. The crash cushion of claim 9, wherein at least one of said plurality of openings is nozzle-shaped.

27. The crash cushion of claim 26, wherein said nozzle-shaped opening includes an orifice that is designed to change size.

28. The crash cushion of claim 2, wherein at least one of said portions that break is nozzle-shaped.

29. The crash cushion of claim 2, wherein said crash cushion is provided in a vehicle door or vehicle roof.

30. The crash cushion of claim 9, wherein said crash cushion is provided in a vehicle door or vehicle roof.

31. The crash cushion of claim 20, further comprising a torsion bar provided within said cushion,
wherein when said protective plate is subject to an impact force, the torsion bar is twisted and displaced in a direction of the impact force.

32. The crash cushion of claim 2, wherein the cushion includes multiple sections, each section having a material with a different viscosity.

33. The crash cushion of claim 9, wherein the cushion includes multiple sections, each section having a material with a different viscosity.

34. The crash cushion of claim 1, wherein the crash cushion is provided with openings for at least one of a grill, a lamp, and a turn signal.

35. The crash cushion of claim 8, wherein the crash cushion is provided with openings for at least one of a grill, a lamp, and a turn signal.

36. The crash cushion of claim 1, wherein said material is a gel.

37. The crash cushion of claim 1, wherein said material is solid, and becomes a fluid when the force greater than said first predetermined force is applied to said cushion.

38. The crash cushion of claim 8, wherein said material is a gel.

39. The crash cushion of claim 8, wherein said material is solid, and becomes a fluid when the force greater than said first predetermined force is applied to said cushion.

40. A crash cushion, comprising:
a cushion filled with material; and
a back plate including at least one weakened area communicating with a back of said cushion; wherein said back plate is configured so that when a force is applied to said cushion, the material breaks a portion of said back plate at said weakened area and exits said cushion through said back plate.

41. The crash cushion of claim 40, wherein said at least one weakened area is a plurality of weakened areas disposed on a back of said cushion such that said material from said cushion is adjacent said weakened areas;
wherein said back plate is configured so that when a force greater than a first predetermined value is applied to said cushion, the material adjacent a first of said plurality of weakened areas breaks a first portion of said back plate and exits said cushion; and when a force greater than a second predetermined value is applied to said cushion, the material adjacent a second of said plurality of weakened areas breaks a second portion of said back plate and exits said cushion, said second predetermined value being greater than said first predetermined value.

42. The crash cushion of claim 40, wherein said material is a gel.

43. The crash cushion of claim 40, wherein said material is solid, and becomes a fluid when the force greater than said first predetermined force is applied to said cushion.

44. The crash cushion of claim 40, further comprising a reservoir provided at a side of the back plate opposite the cushion; wherein said material that exits the cushion enters the reservoir.

45. The crash cushion of claim 40, further comprising an escape canal, wherein said material that has exited the cushion is directed back toward the source of the impact force.

46. The crash cushion of claim 41, wherein the cushion includes multiple sections, each section having a material with a different viscosity.

47. The crash cushion of claim 2, wherein the first recess has a greater depth and a greater area than the second recess.

48. The crash cushion of claim 9, wherein the first valve has a greater thickness and a greater area than the second valve.

* * * * *